United States Patent
Newman

(10) Patent No.: US 10,551,514 B1
(45) Date of Patent: Feb. 4, 2020

(54) DIRECTIONAL ARRAY WITH ALTERNATING SHORT AND LONG DETECTORS

(71) Applicant: David Edward Newman, Poway, CA (US)

(72) Inventor: David Edward Newman, Poway, CA (US)

(*) Notice: Subject to any disclaimer, the term of this patent is extended or adjusted under 35 U.S.C. 154(b) by 10 days.

(21) Appl. No.: 16/362,682

(22) Filed: Mar. 24, 2019

Related U.S. Application Data

(60) Provisional application No. 62/739,170, filed on Sep. 29, 2018, provisional application No. 62/785,464, filed on Dec. 27, 2018.

(51) Int. Cl.
 *G01T 1/29* (2006.01)
 *G01T 1/20* (2006.01)
 *G01T 1/169* (2006.01)
 *G01T 3/06* (2006.01)

(52) U.S. Cl.
 CPC ............ *G01T 1/2907* (2013.01); *G01T 1/169* (2013.01); *G01T 1/2002* (2013.01); *G01T 1/2018* (2013.01); *G01T 3/06* (2013.01)

(58) Field of Classification Search
 None
 See application file for complete search history.

(56) References Cited

U.S. PATENT DOCUMENTS

| | | | |
|---|---|---|---|
| 4,037,105 A | 7/1977 | Laurer | |
| 5,880,469 A | 3/1999 | Miller | |
| 6,392,236 B1 | 5/2002 | Maekawa | |
| 6,566,657 B2 | 5/2003 | Odom | |
| 7,745,800 B1 | 6/2010 | McGinnis | |
| 8,030,617 B2 | 10/2011 | Enghardt | |
| 8,143,586 B2 | 3/2012 | Inbar | |
| 9,733,367 B1 | 8/2017 | Derzon | |
| 9,864,074 B1 | 1/2018 | Newman | |
| 9,958,561 B2 | 5/2018 | Bellinger | |
| 10,416,318 B1 * | 9/2019 | Newman | ................ G01T 3/06 |
| 2003/0226971 A1 | 12/2003 | Chandross | |
| 2008/0191140 A1 | 8/2008 | McDevitt | |
| 2009/0166549 A1 | 7/2009 | Czirr | |
| 2010/0090115 A1 | 4/2010 | Lerch | |
| 2010/0258734 A1 | 10/2010 | McCormick | |
| 2011/0101230 A1 | 5/2011 | Inbar | |
| 2015/0301203 A1 | 10/2015 | Lennert | |
| 2018/0136340 A1 * | 5/2018 | Nelson | ................ A61B 6/4241 |
| 2018/0136344 A1 | 5/2018 | Nelson | |
| 2018/0172853 A1 | 6/2018 | Newman | |

\* cited by examiner

*Primary Examiner* — Edwin C Gunberg

(57) ABSTRACT

A large-area directional radiation detection system may include a large number of slab-shaped detectors stacked side-by-side comprising alternate long and short detectors, where the long detectors are longitudinally longer than the short detectors. The long detectors may collimate or restrict the lateral field of view of the short detectors, so that a particular short detector that is aligned with the source has an unobstructed view of the source. By comparing detection distributions in the long and short detectors, a processor can determine the angular position and distance of a source. The high detection efficiency and large solid angle of the detector array may enable rapid detection of even well-shielded threat sources at substantial distances, while simultaneously determining the positions of any sources detected.

20 Claims, 21 Drawing Sheets

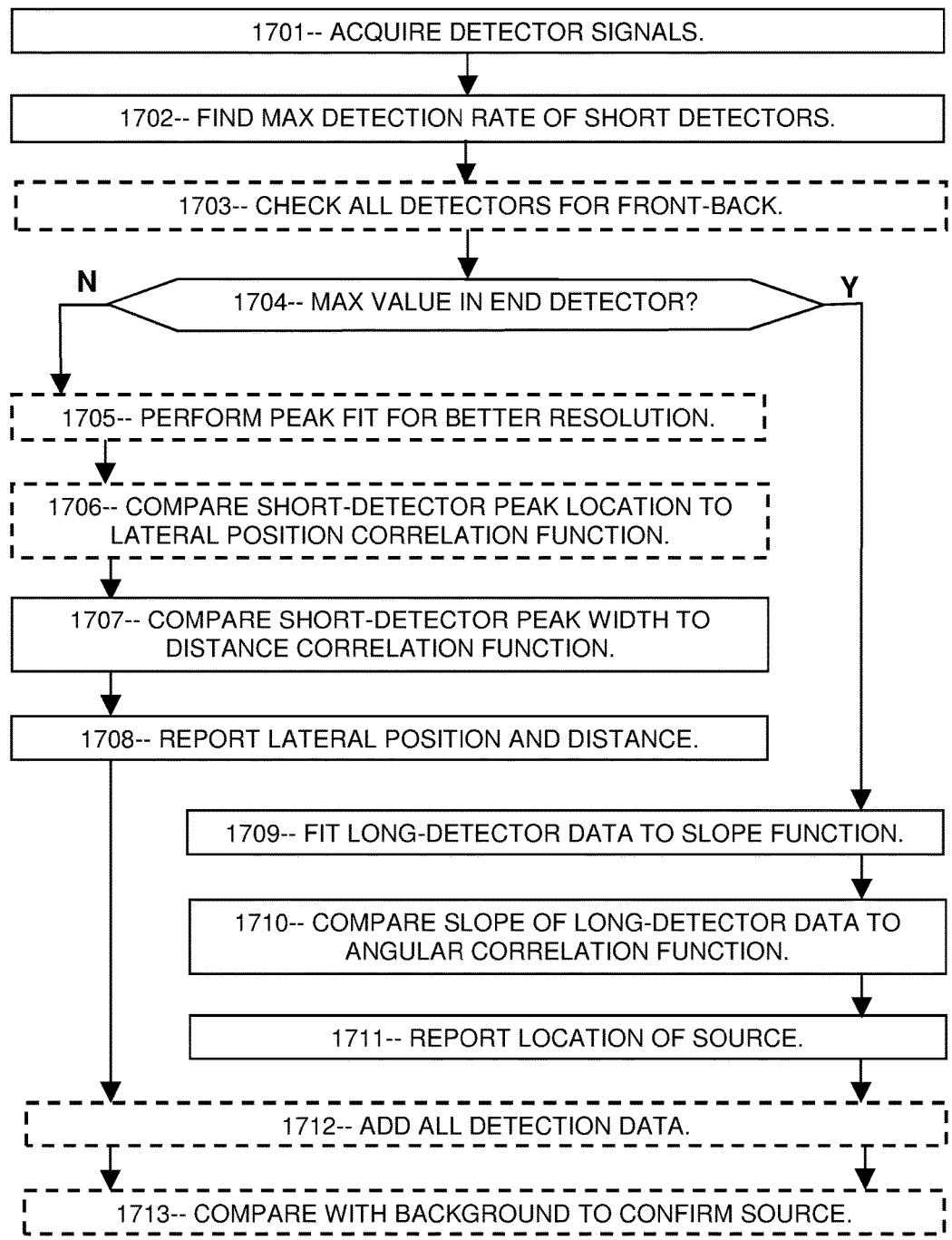

US 10,551,514 B1

DIRECTIONAL ARRAY WITH ALTERNATING SHORT AND LONG DETECTORS

CROSS REFERENCE TO RELATED APPLICATIONS

This application claims the benefit of U.S. Provisional Patent Application No. 62/739,170 filed on Sep. 29, 2018, and U.S. Provisional Patent Application No. 62/785,464 filed on Dec. 27, 2018, the entire disclosures of which are incorporated by reference as part of the specification of this application.

FIELD OF THE INVENTION

The present invention relates generally to detecting a radiation source. More particularly, the present invention is directed in one exemplary aspect to a large-area directional radiation detection system that determines the location of the radiation source.

BACKGROUND

A nuclear weapon is difficult to detect, particularly if it is shielded and hidden among cargo. Depending on the shield design, some radiation, notably gamma rays and neutrons, can leak out. In addition, the amount of time available for an inspection of vehicles and cargo, at an entry port for example, is generally limited to a short period such as one minute so as to not delay the flow of commerce. Unless the threat is emitting a large amount of radiation, the scan may fail to detect the threat in the available inspection time.

If a weapon successfully evades an initial radiation inspection, an adversary can then emplace it in an urban environment or a government center or near a military base, and use it for unlimited extortion or a future attack. Detecting and localizing such a hidden weapon would require a system capable of separating source particles from backgrounds as well as localizing the weapon spatially. Large-area detectors are necessary to intercept a sufficient fraction of the emitted radiation, and advanced designs are needed for directionality.

What is needed, then, is an advanced large-area detector system, capable of detecting gamma rays or neutrons or both, with sufficient detection efficiency to reveal even a very well-shielded nuclear weapon. Preferably the new system should also indicate the position of the weapon, despite clutter and backgrounds and active obfuscation, in a practical scan time, and preferably at minimal cost.

SUMMARY

A detector array for locating a radioactive source comprises at least 10 long detectors interleaved with at least 10 short detectors, each long detector and short detector being configured to detect particles from the radioactive source, and each long detector being positioned parallel to an aiming plane that runs centrally from the back to the front of the detector array, wherein the long detectors and the short detectors are arranged in an alternating sequence, wherein each short detector is shorter than the long detectors by a distance of 1 to 3 times the thickness of the short detectors, wherein the back surface of each short detector is substantially coplanar with the back surface of one or more adjacent long detectors, and wherein the thickness of each long detector is 1 to 3 times the average interaction distance of the particles therein, and a processor configured to be communicatively coupled to each long detector and to each short detector respectively, and further configured to determine a position of the radioactive source by comparing detection data associated with the long detectors to detection data associated with the short detectors.

These and other embodiments are described in further detail with reference to the figures and accompanying detailed description as provided below.

BRIEF DESCRIPTION OF THE FIGURES

FIG. 17 is a flowchart showing steps of an exemplary method for calculating the lateral position, distance, and angle of the source according to some embodiments.

DETAILED DESCRIPTION OF INVENTION

Figure 1:
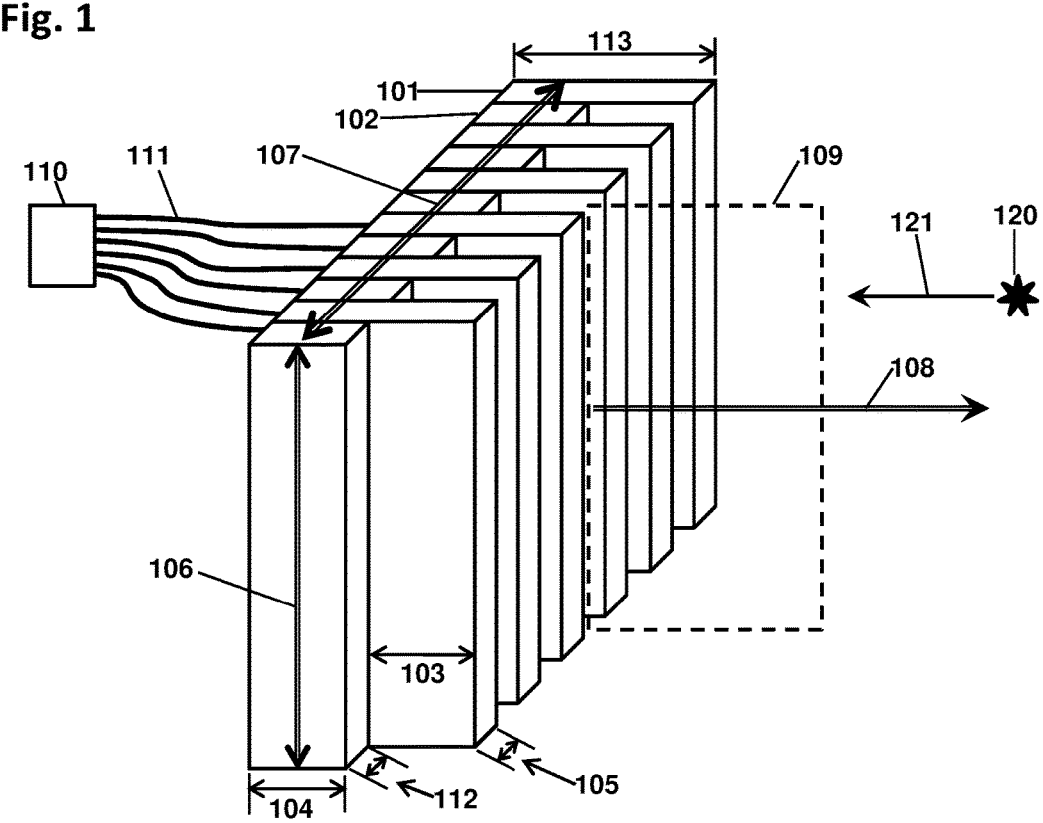
FIG. 1 is a sketch in perspective of an exemplary detector array including an array of long and short detectors in alternation, according to some embodiments.

In the following description, reference is made to the accompanying drawings in which it is shown by way of illustration specific embodiments in which the invention can be practiced. Not all of the described components are necessarily drawn to scale in order to emphasize certain features and to better facilitate the reader's conception of the disclosed embodiments. It is to be understood that other embodiments can be used and structural changes can be made without departing from the scope of the embodiments of disclosed herein.

Disclosed herein is an array of detectors (the "detector array") for detection and localization of nuclear and radiological weapons and their radioactive components, as well as any other radiation sources that are to be located. In some embodiments, the detector array may include slab-shaped or prism-shaped detectors stacked adjacently face-to-face, with each detector being configured to detect gamma rays or neutrons (the "particles") from the source and thereby emit signals such as electrical pulses or light pulses. In some embodiments, the detector array includes no shields or collimators. The detectors may include two interleaved or alternating sets of detectors. The two sets may be termed the "long" and "short" detectors respectively, wherein the short detectors are shorter, in the longitudinal direction, than the long detectors. The back surfaces of the respective long and short detectors are substantially coplanar or longitudinally coincident, which means that the back surface of each short detector is at substantially the same longitudinal coordinate as the back surface of an adjacent long detector, and the back surface of each long detector is at substantially the same longitudinal coordinate as an adjacent short detector. "Substantially coplanar" or "substantially the same coordinate" means that the longitudinal positions of the back surfaces of adjacent long and short detectors are equal to within a short distance, such as 0.5 or 0.1 times the width of the short detectors. In some embodiments, the detector array may include at least 10 long detectors and at least 10 short detectors in an alternating sequence, thereby providing sufficient field of view for localizing the radiation sources.

The "recess distance" is the longitudinal offset distance between the front surfaces of the long and short detectors, or equivalently, the distance that the front surfaces of the short detectors are displaced or offset rearward relative to the long detectors. As mentioned, the back surfaces of adjacent long and short detectors are substantially coplanar, and are not offset from each other. The long and short detectors may be interleaved, or positioned alternately in succession, thereby forming a wall-like assembly of detectors which, when viewed from the front, are longitudinally staggered. Thus, the long and short detectors' front surfaces are respectively displaced toward the front and away from the front in succession.

As used herein, the "source location" refers to spatial location parameters of the source including, without limitation, the front-versus-back position of the source, the distance of the source from the detector array, the angle of the source relative to the detector array, and/or a lateral position of the source relative to the detector array. As used herein, the "lateral" direction is perpendicular to the adjacent surfaces of the long and short detectors, the "longitudinal" direction is parallel to the offset between the long and short detector front surfaces, and the "height" direction is perpendicular to the longitudinal direction and perpendicular to the lateral direction. The major surfaces of the central long detector are parallel to the aiming plane and parallel to the height direction and perpendicular to the lateral direction. A "detection peak" is a group of the short detectors that have enhanced detection rates. "Secondaries", or secondary particles, are charged particles generated by interactions of the source particles, such as Compton electrons and photoelectrons and electron-positron pairs from gamma ray interactions, alpha particles and tritons from neutron-capture reactions, and recoil protons and recoil ions from neutron-scattering interactions.

An "aiming plane" is a centrally and symmetrically positioned plane which is parallel to the longitudinal direction, parallel to the height direction, and perpendicular to the lateral direction. The "source angle" is the angle between the aiming plane and a vector from the center of the detector array to the source. The "lateral position" of the source is the distance from the aiming plane to the source in the lateral direction.

Particles arriving from the source may be detected in the long detectors and/or the short detectors. The long detectors may act as collimators by blocking particles at various angles from reaching the short detectors, and thereby restrict the lateral field of view of the short detectors. Consequently, the distribution of detections in the short detectors generally exhibits a narrow "detection peak", which is a relatively narrow region or subset of short detectors with enhanced detection. Thus the long detectors, by collimating the short detectors, may restrict the field of view of the short detectors, and thereby cause the detection peak to be relatively narrow, or at least narrower than it would be absent the collimation. The long detectors, on the other hand, may be unobstructed in their view of the source, and therefore exhibit a much broader detection distribution. The width of the detection distribution of the long detectors may be determined by the geometrical area of each long detector as viewed by the source. If, on the other hand, the source is positioned behind the detector array, then particles may arrive at the back surfaces of the short and long detectors equally, since there is no collimation in the back. Thus the long and short detectors may have similar distributions of detection data when a source is behind the detector array, aside from small differences in detection efficiencies of the various detectors. As used herein, two detection distributions are "similar" if they have the same amplitude within a small amount such as 20% or 40% and the same width within a small value such as 10% or 20%. Moreover, when the source is in the back, the short detectors do not generally have a narrow detection peak. Therefore the source front-back position can be determined either by the presence or absence of a narrow detection peak in the short detectors, or by a similarly broad detection distribution in both the long and short detectors. In either case, a broad detection distribution in the short detectors indicates that the source is behind the detector array.

In some embodiments, the processor may be communicatively connected to each of the long and short detectors, and can thereby receive signals such as electrical pulses that indicate when each particle detection event occurs in each detector. Such communicative coupling may comprise, for example, cables, optical fibers, metal traces, or other types of conductive leads connecting each detector to the processor. The processor may analyze the signals and thereby determine the detection peak and other detection data, and may thereby determine the source position.

In some embodiments, the processor may include digital and/or analog electronics configured to analyze the detector signals, determine the location and width of the detection peak, and determine the lateral position of the source according to the lateral position of the detection peak. In some embodiments, the processor may be configured to determine the longitudinal distance of the source from the detector array according to the width of the detection peak. In some embodiments, the processor may be configured to determine the angle of the source relative to the detector array according to a slope parameter related to the detection rates of the long detectors. In some embodiments, the processor may be configured to add together the detection rates of all the detectors and to compare that total to a predetermined background rate, and thereby determine whether a source is present.

The processor may include non-transient computer-readable media containing instructions for a method to determine the source location, or parameters of the source location, according to the detection rates in the various detectors. The media may include a predetermined lateral-position correlation function that relates the lateral position of the source to the lateral position of the detection peak, and/or a predetermined peak-width correlation function that relates the source distance to the width of the detection peak, and/or a predetermined slope correlation function that relates the source angle to a slope related to the long detector rates. Examples are presented for detecting gamma rays and neutrons, but the principles disclosed herein are readily applicable to other particle types as well. In any application involving clandestine radioactive threats, the ability to rapidly determine the location of a source is of critical importance.

FIG. 1 is a perspective sketch of an exemplary detector array according to some embodiments. As shown by this figure, the exemplary detector array may include an array of slab-shaped or prism-shaped detectors 101-102 configured to detect particles 121 from a source 120. The detectors 101-102 are shown positioned with their major faces substantially in contact, including long detectors 101 protruding relatively toward the source 120 and short detectors 102 with front surfaces recessed relatively farther from the source 120. The longitudinal offset between the front surfaces of the short 102 and long 101 detectors is the recess distance 103. The long detectors 101 have a thickness 105 in the lateral direction 107 and a width 113 in the longitudinal direction 108. The short detectors 102 may have a thickness 112 in the lateral direction 107 and a width 104 in the longitudinal direction 108. The long 101 and short 102 detectors have about the same height 106. The back surfaces of the detectors 101-102 are substantially coplanar or coincident. The long and short detectors 101 and 102 may be interleaved or placed successively in alternation so that each long detector 101 is flanked by two of the short detectors 102, and each short detector 102 is flanked by two of the long detectors 101 (except for the end detectors which have only one adjacent detector). In some embodiments, the detector array may be shaped as a wall-like assembly of longitudinally staggered detectors 101-102 oriented perpendicular to the lateral dimension 107 of the wall, and positioned alternately recessed and protruding relative to the source 120. The overall shape of the depicted detector array is straight as viewed from the top; that is, the back surfaces of the detectors 101-102 are substantially coplanar. Other shapes are presented below. The lateral size 107 of the entire detector array may be substantially equal to the sum of the thicknesses 105 and 112 of all the detectors 101-102, plus any spacing and intervening material such as wrappings and the like.

Also shown in the sketch is a longitudinal axis 108 projecting centrally perpendicular to the height direction 106 and perpendicular to the lateral direction 107. An aiming plane 109, shown in dash, is a centrally and symmetrically positioned plane parallel to the longitudinal direction 108, parallel to the height direction 106, and perpendicular to the lateral direction 107 of the detector array. As described below, embodiments of the detector array can determine the lateral position of a source 120 relative to the aiming plane 109, the angle of the source 120 relative to the aiming plane 109, the distance or longitudinal position of a source 120 along the longitudinal axis 108, and the front-versus-back position of the source 120. Each such determination may be performed by the processor 110 configured to analyze detection signals 111 emitted by the detectors 101-102 upon detecting the particles 121, or another computer.

In some embodiments, the detectors 101-102 may include material suitable for detecting the particles and/or their charged secondaries. For example, the detectors 101-102 may include scintillators, semiconductors, or gaseous ionization types of detectors. Scintillators may include organic types such as organic crystalline (stilbene or anthracene for example) or polymer (polyvinyltoluene PVT for example) or liquid (based on mineral oil or other organic liquid for example), or inorganic types such as NaI, BGO, LYSO, CsI, $CdWO_4$, and scintillating glass among many other possibilities. For detecting neutrons, the detectors 101-102 may include a transparent matrix such as polycarbonate or polystyrene or PMMA (poly methylmethacrylate), which may be coated or loaded with a neutron-specific scintillator such as layered ZnS or scintillator microbeads for example. The ZnS or the scintillator microbeads may contain or be proximate to a neutron-capture nuclide such as lithium or boron, and may include lithium glass or borosilicate scintillator. Semiconductor detectors may include n-type or p-type reverse-biased junctions, optionally including a converter layer such as a hydrogenous material for neutron scattering, or a neutron-capture material such as boron or lithium, or a high-Z material for gamma conversion (Z being the atomic number). Gaseous ionization detectors may include proportional counters, Geiger tubes, or other gas-filled enclosures configured to collect ionization charges generated by the particles and/or their secondaries in the gas, and optionally layered or coated with a high-Z gamma converter, or a lithium or boron neutron-capture layer, or a hydrogenous neutron-scattering layer for example. Responsive to detecting the particles, the detectors 101-102 may emit signals 111 such as electronic pulses which may be conveyed to the processor 110 for analysis. The detectors 101-102 and/or the processor 110 may include optical and/or analog electronics to tailor the signals 111 for analysis, such as light sensors for scintillator detectors or amplifiers for semiconductor detectors, as well as transducers, filters, amplifiers and the like.

In some embodiments, the detectors 101-102 may be configured to detect one particle type and to not detect another particle type, such as detecting neutrons but not gamma rays, or vice-versa. In some embodiments, the detectors 101-102 may be configured to emit a first signal responsive to detecting a neutron interaction, and a second signal different from the first signal responsive to detecting a gamma ray interaction. For example, detectors including ZnS and LiF layered in PMMA are sensitive to neutrons but essentially blind to gamma rays due to the excitation threshold of ZnS scintillator. Alternatively, many inorganic scintillators such as NaI and BGO are efficient gamma detectors but nearly neutron-blind due to the low neutron-capture rates for the nuclides involved and the lack of recoil hydrogen. In other embodiments, the detectors may be configured to emit signals indicative of the particle type, such as PSD (pulse-shape discriminating) organic scintillators, or certain inorganic scintillators such as CsI and elpasolites, that emit differently shaped pulses for gamma-generated electrons and neutron-generated ions. In some embodiments, the processor may be configured to reject any events in which a detector registers an energy deposition greater than the maximum energy of the particles being sought. For example, most gamma rays and neutrons from nuclear materials have energies in the range of 1-2 MeV with a few reaching 4-5 MeV. A cosmic ray, on the other hand, traveling at nearly the speed of light, generally deposits energy at a rate of 2 MeV per cm of path in organic scintillators (with density of about 1 $gm/cm^3$). Thus, for a plastic scintillator detector with a thickness of 15 cm and a height of 200 cm, cosmic rays generate huge pulses corresponding to at least 30 MeV (going orthogonally through the thickness) up to 400 MeV (for a vertical path). Therefore, an energy cutoff at about 5 MeV eliminates almost all of the cosmic ray background events, other than a tiny fraction that pass through a corner of the detector.

In some embodiments, the thickness 105 of the detectors 101-102 may be related to the average interaction distance of the particles in the detector material. The average interaction distance is the distance that the particle travels, on average, before being scattered or absorbed or otherwise interacting detectably with the material. For example, the average interaction distance may be an inverse mass-attenuation factor for gamma rays, or an elastic scattering distance for energetic neutrons, or a (projected) neutron-capture mean free path for low energy neutrons. In some embodiments, the long detector thickness 105 may be at least equal to the average interaction distance of the particles in the detector material and thereby provide sufficient collimation or contrast between the protruding long 101 and recessed short 102 detectors. In other embodiments, the long detector thickness 105 may be 2 or 3 or more times the average interaction distance, so as to provide greater contrast. In a preferred embodiment, the long detector thickness 105 is 1 to 3 times the average interaction distance of the particles in the detector material.

In some embodiments, the longitudinal sizes (or "width") of the detectors 101-102 may be related to the average interaction distance of the particles. For example, the longitudinal size 104 of the short detectors 102 may be at least equal to the average interaction distance so as to provide sufficient detection efficiency, or more preferably at least 2 times the average interaction distance for additional detection efficiency, and may be, for example, 3 or 4 or 5 or 10 or more times the average interaction distance for further detection efficiency.

In some embodiments, the offset or recess distance 103 may be related to the short detector thickness 112. For example, the offset distance 103 may be at least equal to the short detector thickness 112 so as to provide a sufficiently narrow angular field of view of the short detectors 102. In other embodiments, the offset distance 103 may be 2 or 3 times the short detector thickness 112 for improved angular resolution, and in some embodiments the offset distance 103 may be 4 or 5 times the short detector thickness 112 or more. In a preferred embodiment, the short detectors 102 are recessed relative to the long detectors 101 by a distance 103 of 1 to 3 times the thickness 112 of each short detector 102. The long detectors 101 may block particles 121 that arrive at certain angles, thereby restricting the angular field of view of each short detector 102, wherein the angular field of view of each short detector 102 is related to the ratio of the offset distance 103 to the short detector thickness 112. Specifically, a higher ratio results in a narrower angular field of view for each short detector 102.

In some embodiments, the height 106 of the detector array may be at least 0.2 meters to intercept a sufficient fraction of the emitted particles 121, and more preferably at least 0.5 to 1 meter for a greater solid angle, and may be 2 or 3 or 4 meters or more when needed to scan large objects. In some embodiments, the lateral size 107 of the detector array may be at least 0.2 to 0.5 meters to view a sufficient range of lateral positions, and more preferably at least 1 to 2 meters for a greater lateral range, and may be 3 or 5 or 10 or 20 meters or more depending on the size or distance of the inspection item. The number of detectors 101-102 in the detector array may be substantially equal the lateral size 107 of the array divided by the average of the short and long detector thicknesses 112 and 105, aside from intervening materials such as foil and tape for example. In some embodiments, the number of detectors may total at least 10 to provide a sufficient spatial resolution, and more preferably 20 detectors for a larger total field of view, and may be 30 or 50 or 100 or 200 or more detectors in a large inspection installation.

In a first exemplary embodiment, the detectors 101-102 may include a PVT-based scintillator configured to detect 1-2 MeV gamma rays by Compton scattering, or alternatively a PSD-type scintillator configured to detect both gammas and high-energy neutrons. The detector array height 106 may be 2.5 meters, the detector array lateral size 107 may be 15 meters, the detector thicknesses 105-112 may be 15 cm, the total number of detectors may be 100, the longitudinal size of the long detectors may be 50 cm, the longitudinal size of the short detectors may be 25 cm, and the offset distance 103 may be 25 cm, thereby providing a detection area of 37.5 square meters and a detector array weight (not including accessories discussed below) of about 14 tons.

In a second exemplary embodiment, the detectors 101-102 may include BGO scintillator configured to detect 100-500 keV gamma rays. The detector array height 106 may be 0.5 meters, the detector array lateral size 107 may be 1 meter, the detector thicknesses 105-112 may be 1 cm, the total number of detectors may be 100, the longitudinal size 104 of the long detectors 101 may be 4 cm, and the offset distance 103 may be 2 cm, thereby providing a detection area of 0.5 square meters and a total weight of about 120 kg.

In a third exemplary embodiment, the detectors 101-102 may include a PMMA matrix loaded with scintillating microbeads containing ZnS or other scintillator, along with lithium or boron neutron-capture targets, and thereby configured to detect neutrons. The detector array height 106 may be 4 meters, the detector array lateral size 107 may be 20 meters, the detector thicknesses 112-105 may be 10 cm, the total number of detectors may be 200, the longitudinal size of the long detectors may be 40 cm, and the offset distance 103 may be 20 cm, thereby providing a detection area of 80 square meters and a detector array weight of about 24 tons.

In a fourth exemplary embodiment, the detectors 101-102 may include proportional detectors in either cylindrical tubular form with a central anode wire, or in a planar form with a wire grid anode between cathode foils, including a neutron-capture nuclide coating on the inside surfaces of the tubes or foils to detect neutrons. The detector array height 106 may be 2 meters, the detector array lateral size 107 may be 6 meters, the longitudinal size of the long detectors may be 60 cm, thereby providing a detection area of 12 square meters and a detector array weight of about 200 kg assuming aluminum construction.

Figure 2:
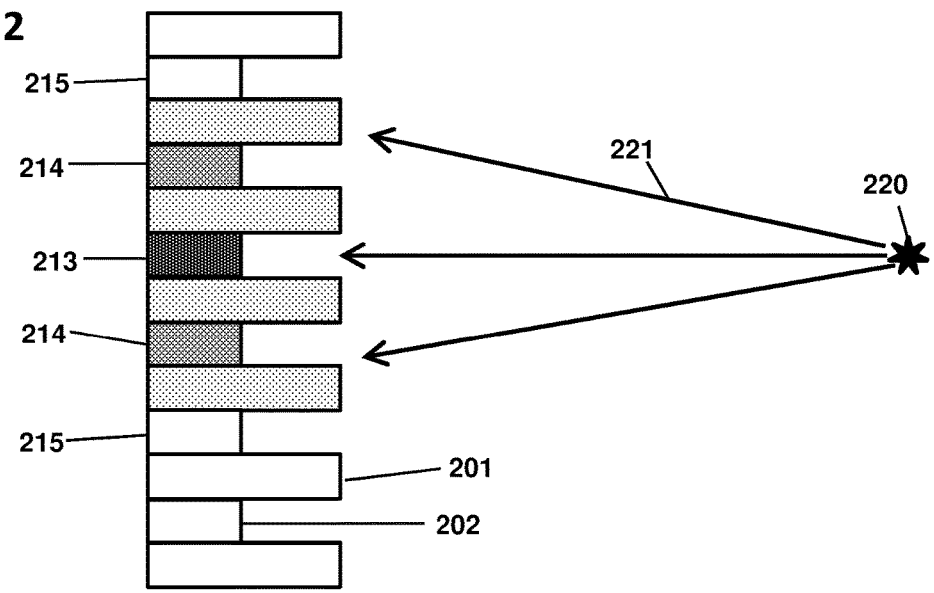
FIG. 2 is a cross-section sketch of an exemplary detector array including alternating long and short detectors and a radioactive source according to some embodiments.

FIG. 2 is a top-view cross-section sketch of an exemplary detector array showing long detectors 201 alternating with short detectors 202 according to some embodiments. A source 220 is shown in front (to the right in this sketch) and is emitting particles 221. A particular short detector 213 is directly aligned at the source 220, and therefore is unobscured by any of the long detectors 201. The particular short detector 213 therefore has a high detection rate as indicated by the dark stipple fill. The neighboring short detectors 214 are partially obscured, and therefore have lower detection rates, as shown in medium stipple. The other short detectors 215 are nearly or completely blocked by the long detectors 201 and are shown clear. The distribution of detections in the various short detectors 202 thus exhibits a narrow detection peak, or region of enhanced detection, with a maximum detection rate in the particular short detector 213 that is directly aligned with the source 220. The lateral position of the detection peak in the short detectors 202 thereby indicates the lateral position of the source 220.

The long detectors 201 also detect the particles 221, but unlike the short detectors 202, the long detectors 201 have a much broader detection distribution since the long detectors 201 directly face the source 220 without collimation. In general, each long detector 201 has a detection rate proportional to its geometrical area as viewed by the source 220, and consequently the distribution of particle detections in the long detectors 201 is much wider than the narrow detection peak of the short detectors 202.

In some embodiments, the processor may be configured to first determine whether a source is present, then to determine whether the source is in back or front of the detector array, and then to determine the lateral position and longitudinal distance of the source. The processor may determine whether a source is present by adding the detection rates of all the detectors 201-202, and comparing that total detection rate to a predetermined background rate, thereby determining that a source is present if the total detection rate exceeds the background rate substantially, such as exceeding it by 1 or 2 or 3 or more times the expected statistical uncertainty.

Normally in an inspection application, the source (if present) is expected to be in front of the detector array. However, if a source occurs behind the detector array, the processor may be configured to determine that fact. In some embodiments, the processor may determine whether the source 220 is in front or behind the detector array by comparing the distribution of detection data in the short 202 and long 201 detectors respectively. If the source is in front, the short detectors 202 have a narrow detection peak compared to the long detectors 201, due to the collimation, whereas a source in back generates broad detection distributions in both types of detectors 201-202 with a similar overall shape (other than any difference in the intrinsic detection efficiencies of the long and short detectors 201-202). For example, the detection distributions in the short and long detectors 201-202 may be similar if they have the same amplitude or height within 20% to 40% of the largest value, and the same width within 10% to 20% of the widest distribution.

In some embodiments, the processor may be configured to determine the lateral position of the source 220. For example, the processor may simply determine that the lateral position of the source 220 is equal to the lateral position of the detection peak, without further corrections. This may be satisfactory for many applications. However, the detection distribution is often modified by scattering or end effects or other effects, in which case a more precise value for the source lateral position may be obtained by using a predetermined lateral-position correlation function that accounts for such effects. Accordingly, the processor may obtain an improved estimate of the lateral source position by using a predetermined lateral-position correlation function that relates the lateral position of the detection peak to the true lateral position of the source including corrections. As a further option, the processor can fit the detection peak to a parabolic or Gaussian or other shape, and can then provide the lateral position of the centroid of that fit to the lateral-position correlation function, thereby obtaining an even more precise determination of the lateral position of the source 220.

In some embodiments, the predetermined lateral-position correlation function may be prepared, for example by measuring the detection peak position while a test source is moved to various positions around the detector array. The measured values of the position of the detection peak for various positions of the test source thereby comprise the lateral-position correlation function. Alternatively, a simulation program such as MCNP or GEANT may be used to prepare the lateral-position correlation function by calculating the detection rates in a simulated detector array as the lateral position of a simulated source is varied, and correlating the resulting detector peak position with the simulated source position. As used herein, a "correlation function" is a set of data that relates a measured value to a predicted parameter, for example relating the lateral position of a detection peak to the lateral position of the source. Such correlation functions may include analytic functions, tables of measured or computed values, algorithms such as computer programs, graphical devices, or other set of data that can be used to derive the predicted parameter from the measured value. In addition, when the correlation function includes discrete values, such as tabular values, then the values may be interpolated to obtain results lying between the predetermined table values.

In some embodiments, the processor can determine the distance from the detector array to the source 220. The source distance is generally related to the width of the detection peak. As shown in the figure, the short detectors 202 are collimated by the long detectors 201 and thus the short detectors 202 have a narrow detection peak, while the long detectors 201 face the source 220 openly and hence have a much wider detection distribution. The width of the detection peak may be determined by any suitable calculation, such as the FWHM (full width at half-maximum) of the detected counts, or a parabolic fit or Gaussian fit or other fitting function, or by determining the curvature or second derivative of the distribution, or by other analysis means to estimate the detection peak width from the distribution of counting rates among the short 202 detectors. In addition, a predetermined peak-width correlation function may be prepared that relates the width of the detection peak to the source distance. The peak-width correlation function may be prepared by measuring the width of the detection peak while a test source is placed at various distances from the detector array. The measured widths of the detection peaks comprise the peak-width correlation function for the source distances employed. Alternatively, a simulation program can be used to determine the detection peak widths in a simulated detector array as a simulated source is varied in distance. In either case, the peak-width correlation function is a set of data that relates the source distance to the width of the detection peak. The processor may be configured to determine the source distance by calculating the width of the detection peak and providing that value to the predetermined peak-width correlation function, which then provides an estimate of the source distance.

At larger source distances and larger source angles, the detection distribution in the long detectors 201 may be used to determine the source angle. The distribution of detections in the long detectors 201 is related to the exposed geometrical area of each detector, which is angle-dependent. As viewed by the source 220, the detection distribution changes as the source angle is increased. For example, at larger source distances, the distribution of detections in the long detectors 201 may exhibit a slope which is related to the angle of the source 220, as detailed below. In that case, the source angle may be determined by fitting the slope of the long detector data, and providing that slope to a predetermined slope correlation function, which then determines the source angle.

FIGS. 3A, 3B, 3C, and 3D are charts from a simulation using the program MCNP6 to detect simulated 1 MeV neutrons from a source placed at various lateral positions relative to a simulated detector array. The simulation layout is illustrated in FIG. 3E. The simulation was intended to test how well a vehicle inspection station could locate nuclear materials in cargo. The simulated source was positioned 3 meters from the front of the detector array, in accordance with many inspection arrangements. The simulated detector array had 99 detectors of PMMA with 100 ppm (at/at) loading of $^{10}B$ which was surrounded by an unspecified organic scintillator to detect the alpha particles from neutron capture. The long and short detector thickness was 15 cm and the offset distance was 30 cm. The endmost detectors were long detectors at both ends of the simulated detector array. Each chart shows the detection rate (arb. units) for each detector, with open circles for the short detectors and filled circles for the long detectors, one data point per detector. As expected, the short detectors show a narrow detection peak corresponding to the subset of short detectors that have direct or partial exposure from the source, while the long detectors show a much broader detection distribution due to geometrical effects. The sharpness of the short detector peak enables a precise determination of the lateral position of the source in some embodiments.

The simulated source was placed at lateral positions of 0, 1.1, 2.5, 5.2, and 17 meters, and the longitudinal distance of the source from the detector array was held constant at 3 meters. The charts correspond to source positions as follows: FIGS. 3A, 3B, 3C, and 3D had lateral source positions of 0, 1.1, 5.2, and 17 meters respectively, all with the same longitudinal distance of 3 meters. The 2.5 meter data is not charted, but it falls between the 1.1 and 5.2 meter results as discussed below.

Figure 3A:
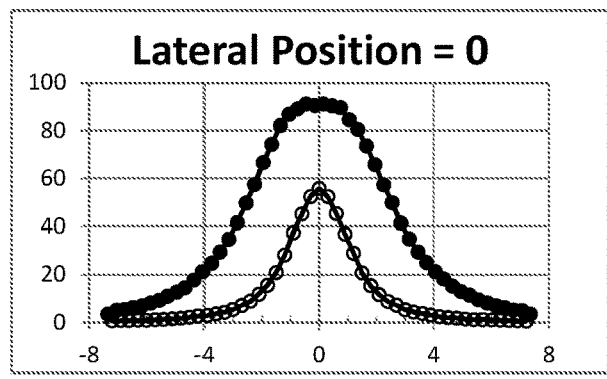
FIG. 3A is a first chart showing the distribution of detections in a simulated detector array versus the lateral position of a simulated neutron source.
Figure 3B:
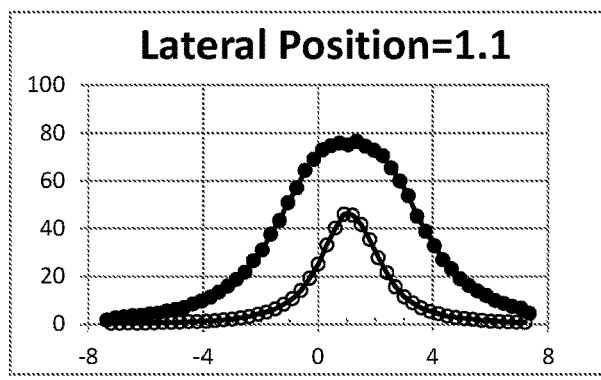
FIG. 3B is a second chart showing the distribution of detections in a simulated detector array versus the lateral position of a simulated neutron source.
Figure 3C:
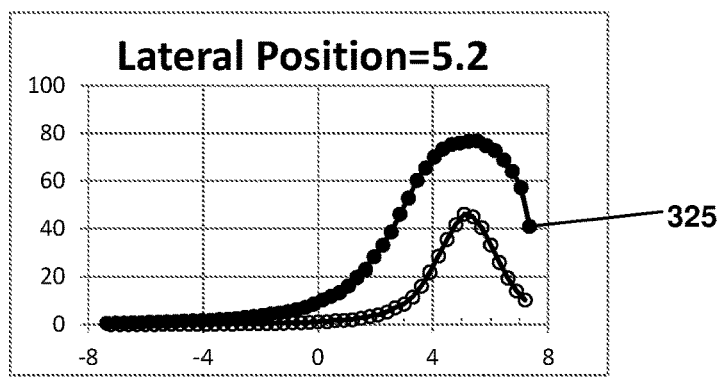
FIG. 3C is a third chart showing the distribution of detections in a simulated detector array versus the lateral position of a simulated neutron source.

In FIG. 3C, the data point 325, corresponding to the endmost long detector, is substantially lower than the others, which may appear surprising. However, this effect is real and is due to scattering. A significant fraction of the detections registered in each detector come from particles that first enter a different detector and then scatter into the adjacent detector. Thus the full counting rate in each detector is a combination of particles that directly impinge on that detector, plus other particles that scatter into it from an adjacent detector. The end unit 325 has no scattering partner on one side, and thus has a lower total detection rate.

Figure 3D:
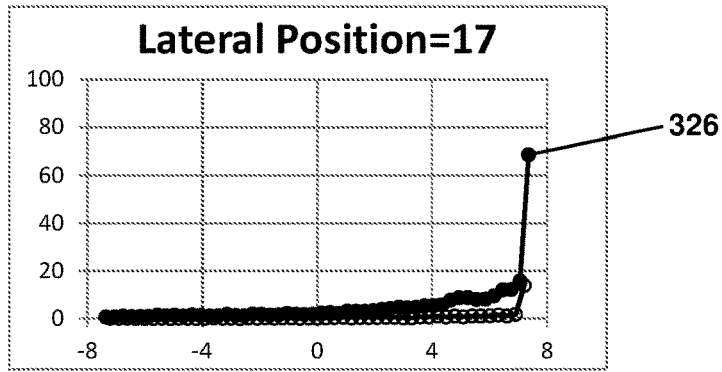
FIG. 3D is a fourth chart showing the distribution of detections in a simulated detector array versus the lateral position of a simulated neutron source.
Figure 3E:
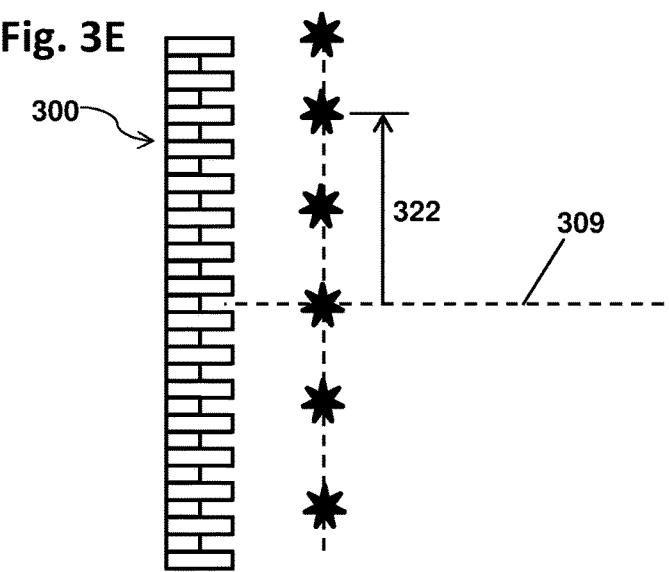
FIG. 3E is a cross-section sketch of an exemplary detector array and various lateral source positions according to some embodiments.

The opposite effect can be seen in FIG. 3D, where the endmost long detector rate 326 is much higher than any of the others. This effect is seen whenever the lateral position of the source is beyond the end of the detector array. In this simulation, the detector array extends from −7.5 to +7.5 meters, whereas in FIG. 3D the lateral source position was at 17 meters from the center of the array. Thus the source is well beyond the end of the detector array or, equivalently, outside the direct field of view of the detector array. From that position, most of the neutrons arriving at the detector array strike the endmost long detector since it is exposed to the neutron flux across its entire longitudinal surface, and very few neutrons reach any of the other detectors since they are mostly blocked by the endmost detector. Accordingly, the endmost detection rate 326 is very high while all the others are near zero. The elevated detection rate 326 of the endmost detector thereby indicates that the source is present, and that it is located outside the ±7.5 meter direct viewing range of the detector array, and that it is on the same lateral side as the high-counting detector 326.

Figure 3F:
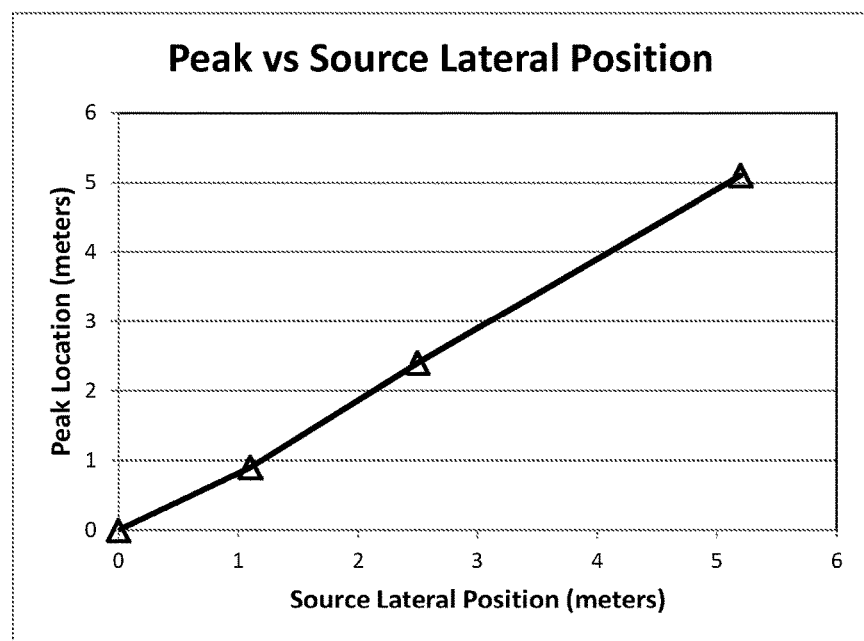
FIG. 3F is a chart showing simulation results correlating a peak location to the lateral position of a simulated source.

FIG. 3E is a cross-section schematic of the simulated detector array 300 with various lateral source positions 322 relative to the aiming plane 309 (shown as a dashed line in this top view). FIG. 3F is a chart showing the lateral-position correlation function between the observed detection peak position, versus the actual source position in the simulation. The chart shows that the lateral position of the source is closely correlated with the lateral position of the peak for source locations within the direct field of view of the rearward detectors. The source lateral position is not exactly equal to the lateral position of the highest-counting detector due to various scattering and end effects, as mentioned. Therefore, to obtain a precise determination of the lateral position of the source, the processor may be configured to compare the lateral position of the peak to the predetermined lateral-position correlation function shown in FIG. 3E, which then provides as output the precise lateral position of the source with all corrections included.

Figure 4A:
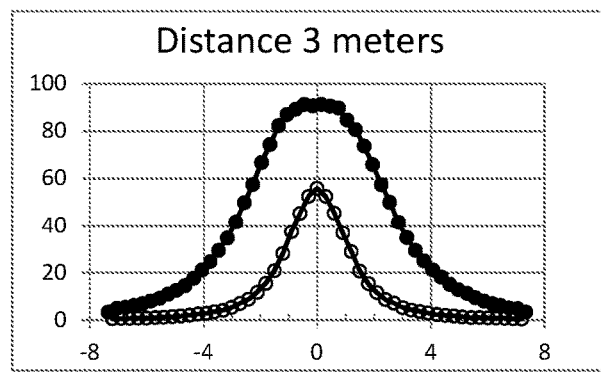
FIG. 4A is a first chart showing the distribution of detections in a simulated detector array versus the longitudinal distance of a simulated neutron source.
Figure 4B:
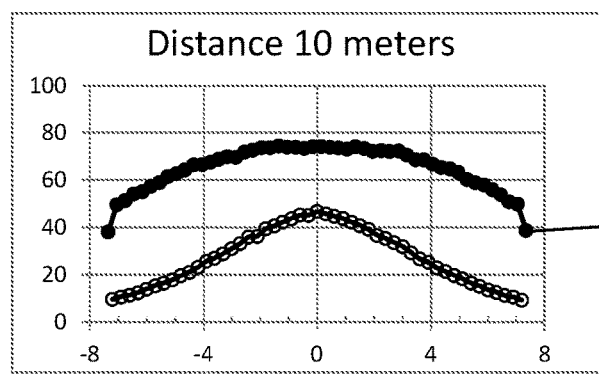
FIG. 4B is a second chart showing the distribution of detections in a simulated detector array versus the longitudinal distance of a simulated neutron source.
Figure 4C:
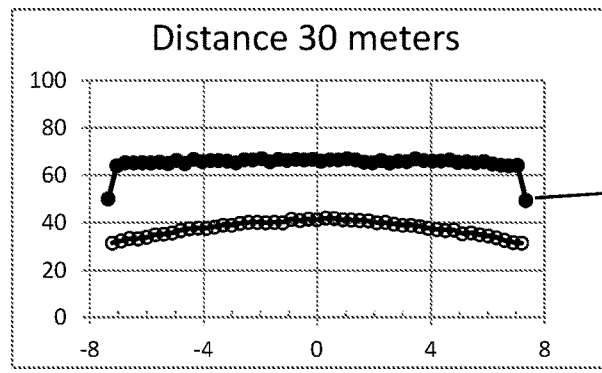
FIG. 4C is a third chart showing the distribution of detections in a simulated detector array versus the longitudinal distance of a simulated neutron source.
Figure 4D:
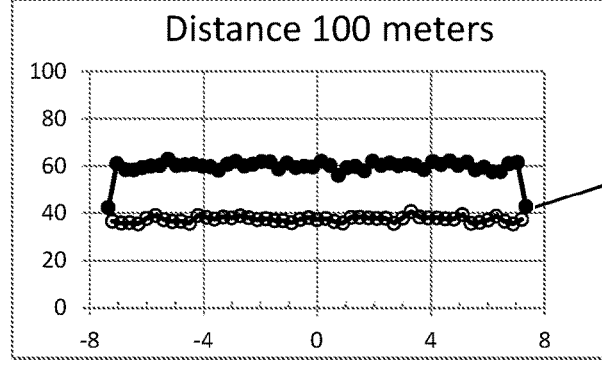
FIG. 4D is a fourth chart showing the distribution of detections in a simulated detector array versus the longitudinal distance of a simulated neutron source.
Figure 4E:
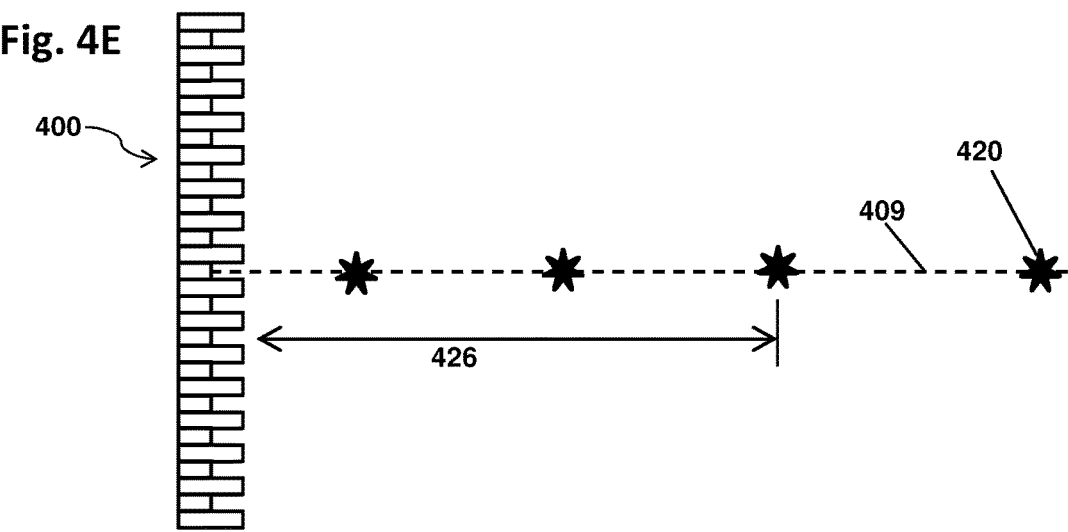
FIG. 4E is a cross-section sketch of an exemplary detector array with various longitudinal source positions according to some embodiments.

FIGS. 4A, 4B, 4C, and 4D are charts from the MCNP6 simulation, but now with the source positioned at various distances along the longitudinal axis, as illustrated in FIG. 4E. The data in FIGS. 4A, 4B, 4C, and 4D correspond to a source longitudinal distance of 3, 10, 30, and 100 meters respectively. Longer runs were used for the larger distances. The intended application is a mobile area scanner of the type used to search for hidden sources by acquiring detection data continuously while traveling around a wide area, such as an urban environment. At a longitudinal source distance of 3 meters, the short detectors (open data points) show a narrow detection peak, as previously discussed. At 10 meters distance (FIG. 4B), the detection peak is much wider than at 3 meters distance, since at larger distances the collimating or obscuration effect of the long detectors is correspondingly reduced. At 30 meters (FIG. 4C) the detection peak is very broad, and at 100 meters (FIG. 4D) the curvature is imperceptible by eye. The endmost long detectors 423, 424, and 425 again exhibit lower detection rates since they lack a scattering partner on one side, as mentioned.

Figure 4F:
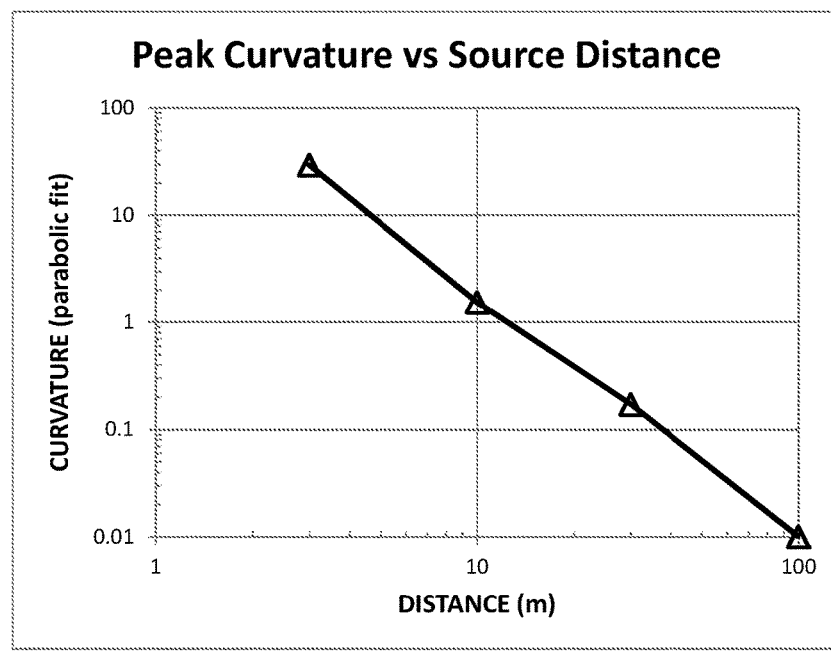
FIG. 4F is a chart showing simulation results correlating a peak curvature to the longitudinal position of a simulated source.

FIG. 4E is a schematic showing the simulated detector array 400 for the simulations of FIGS. 4A-4D. The simulated source 420 was placed at various longitudinal distances 426 from the detector array 400 and centered on the aiming plane 409. The detection rates for the short detectors were fit to a parabolic model to quantify the curvature of the detection data. The resulting chart, FIG. 4F, shows the peak-width correlation function that relates the source longitudinal distance to the observed peak width, as measured by the parabolic curvature. The correlation is consistent all the way out to 100 meters distance. Based on this result, then, the processor can be configured to determine the source distance by comparing the width or curvature of the recessed detection peak to the predetermined peak-width correlation function as shown, which provides the source distance directly as output. These results indicate that a mobile scanner using embodiments of the present detector array can detect radioactive sources at substantial ranges and can quantify the longitudinal source distance accordingly.

Figure 5A:
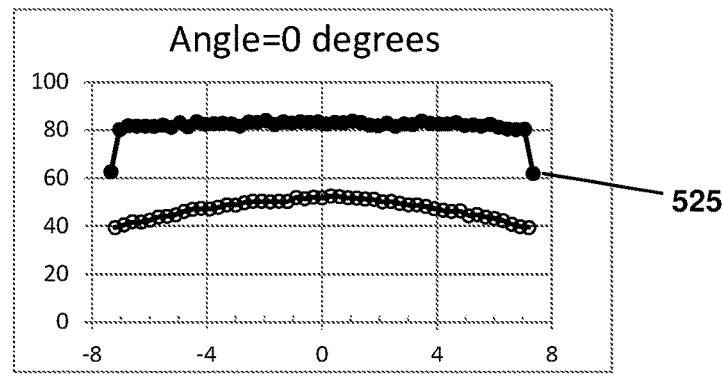
FIG. 5A is a first chart showing the distribution of detections in a simulated detector array versus the angular position of a simulated neutron source.
Figure 5B:
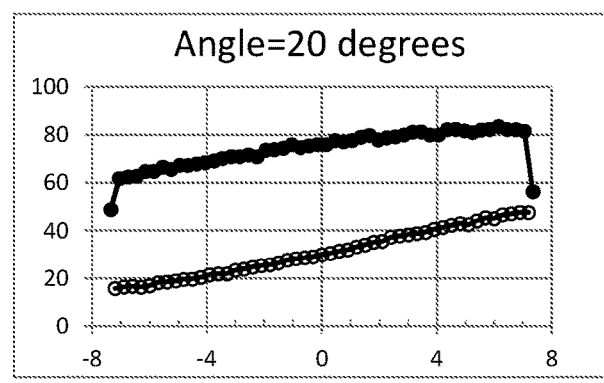
FIG. 5B is a second chart showing the distribution of detections in a simulated detector array versus the angular position of a simulated neutron source.
Figure 5C:
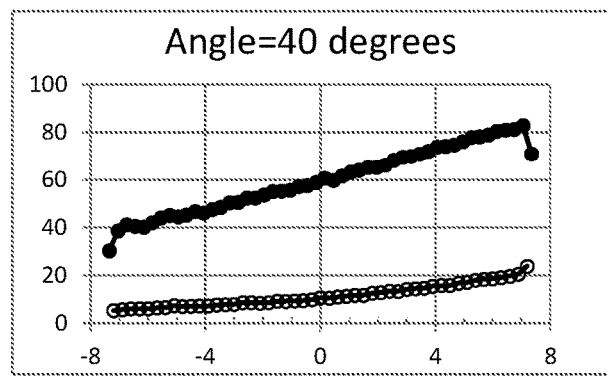
FIG. 5C is a third chart showing the distribution of detections in a simulated detector array versus the angular position of a simulated neutron source.
Figure 5D:
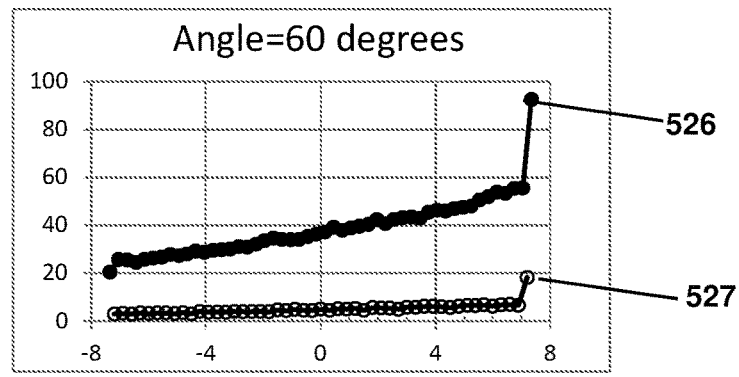
FIG. 5D is a fourth chart showing the distribution of detections in a simulated detector array versus the angular position of a simulated neutron source.
Figure 5E:
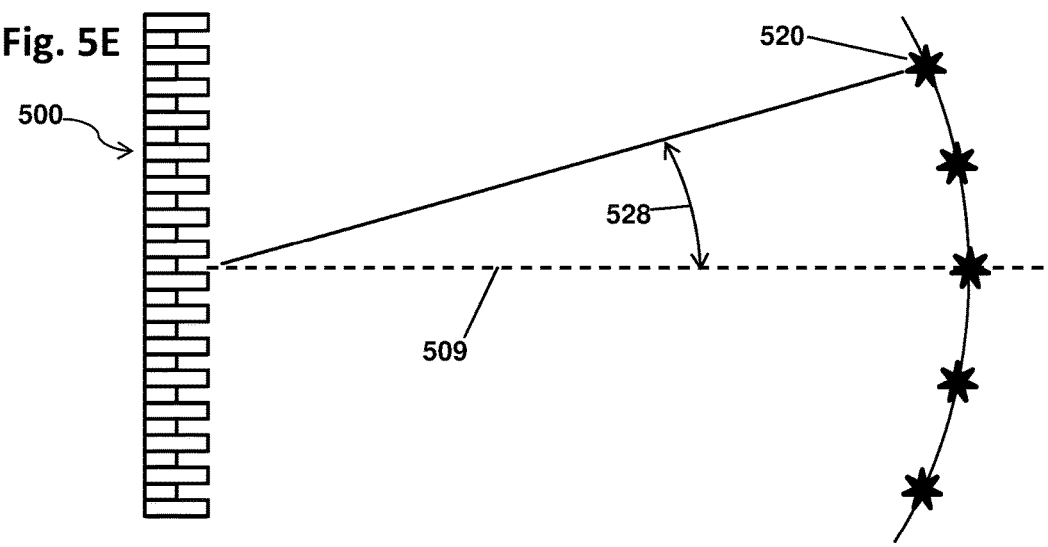
FIG. 5E is a cross-section sketch of an exemplary detector array with various angular source positions according to some embodiments.

FIGS. 5A, 5B, 5C, and 5D are further charts from the MCNP6 simulation, now varying the angle of the source, with the radial distance of the source being constant at 30 meters. FIG. 5E shows the simulated layout. The source angles for FIGS. 5A-5D were zero, 20, 40, and 60 degrees relative to the aiming plane. The charts indicate that the slope of the long detector distribution is strongly dependent on the source angle. The endmost values 525 again show lower detection rates due to the lack of scattering-in, as discussed. On the other hand, the endmost data point 526 of the 60-degree simulation is substantially above the neighboring points, thereby indicating that the source is well outside the direct viewing zone of the detector array for that angle, so that most of the arriving particles struck the exposed side of the endmost long detector. The 60-degree data also shows an enhanced detection rate in the endmost short detector 527, due to particles that scatter through the endmost long detector 526, and then interact in the adjacent short detector 527.

Figure 5F:
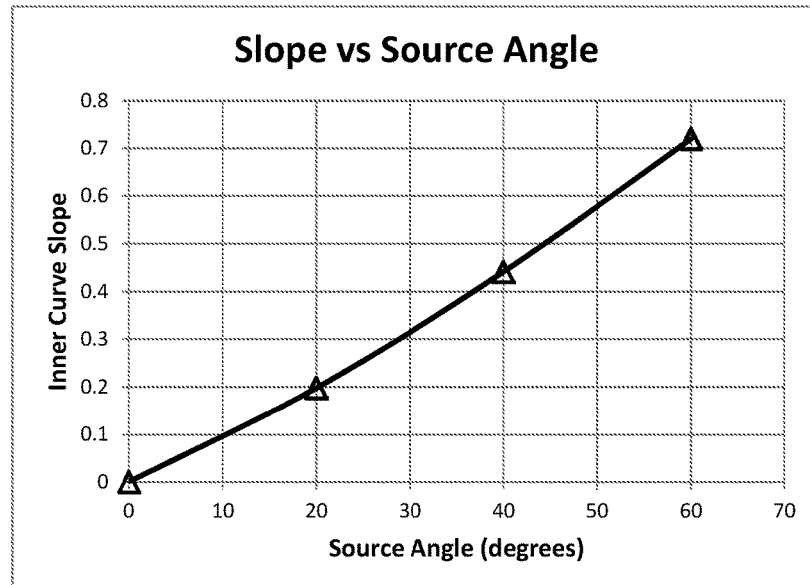
FIG. 5F is a chart showing simulation results correlating a fitted slope to the angular position of a simulated source.

FIG. 5E is a top-view cross-section sketch of the simulated detector array 500 with various positions of the source 520 at different angles 528 relative to the aiming plane 509. FIG. 5F is a chart showing the slope correlation function that relates the source angle to the slope of the long detector data, including the effects of the endmost detectors. The smooth curve of FIG. 5F demonstrates that even at large radial distances, the source angle can be determined by the data using this analysis. Therefore the processor may be configured to calculate a slope associated with the long detector data and then compare the slope to a predetermined slope correlation function, which provides the source angle relative to the aiming plane 509, the result being valid in this case for source angles up to 60 degrees.

All of the simulations were repeated using 1 MeV gamma rays into a PVT-based scintillator detector array, which resulted in essentially the same results as the neutron simulations presented above. The results of both the gamma ray and neutron simulations indicate that embodiments of the detector array can detect and localize a radioactive source, and can determine the front-versus-back location of the source, the source lateral position, the source angle, and the source distance from the detector array. For many inspection applications, the ability to pinpoint the source location, as demonstrated by these simulations, is critically important.

Figure 6:
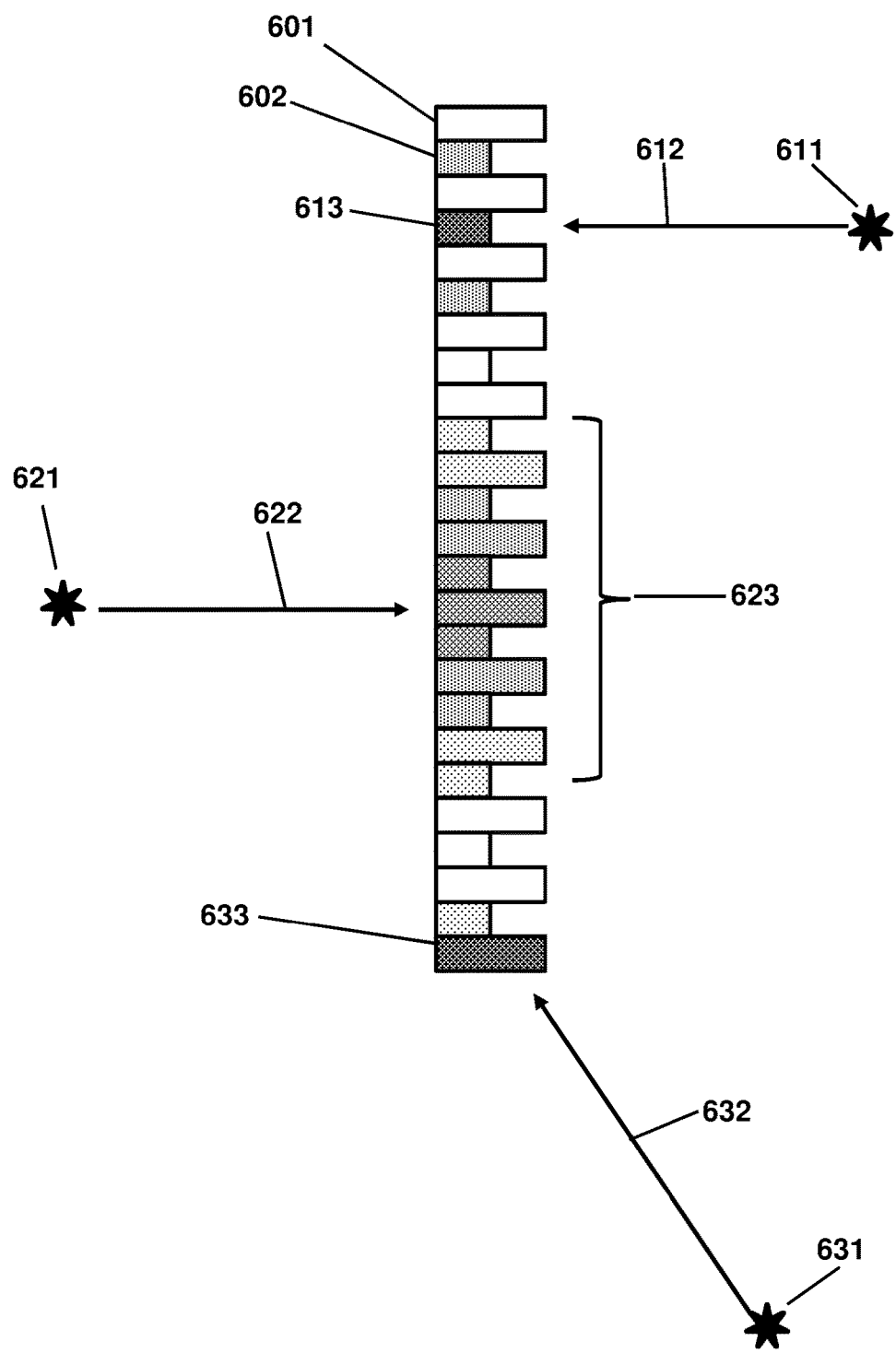
FIG. 6 is a sketch in cross-section of an exemplary detector array detecting multiple sources according to some embodiments.

FIG. 6 is a cross-section sketch of an exemplary embodiment of a detector array according to some embodiments, configured to detect and localize multiple sources simultaneously, both in front and behind the detector array. The detector array may include interleaved long detectors 601 and short detectors 602. A first source 611 is in front of the detector array (to the right of the sketch), and emits particles 612 which are detected in a particular short detector 613 which is directly aligned with the first source 611. The first source 611 thus produces a narrow detection peak in the short detectors 602, centered on the particular short detector 613 as indicated. The long detectors 601 also detect the first source 611 but with a broad distribution which, for clarity, is not depicted.

A second source 621 is in back of the detector array and emits particles 622 which are detected in a range 623 of long and short detectors 601-602. The back surfaces of the long and short detectors 601-602 are substantially coincident or coplanar. Therefore there is no collimation related to the back-positioned source 621, and each detector 601-602 receives particles 622 according to the geometric area exposed to the second source 621. Without the collimation effect, the source 621 produces only the broad distribution 623 of detections, without a narrow detection peak. As depicted, the short and long detectors 601-602 both have a broad distribution of detections 623 without a narrow detection peak in the short detectors 602. The processor can determine from the similarly broad detection distribution 623 in both the short and long detectors 601-602 that the source 621 is in the back. Alternatively, the processor can determine from the absence of a narrow detection peak in the short detectors 602 that the source 621 is in the back.

A third source 631 is in the front but at a large angle to the detector array and thus beyond the direct field of view of the detector array. The "direct field of view" is the range of angles or locations at which at least one of the short detectors has an unobstructed view of the source. When a source is beyond the direct field of view, one of the endmost detectors generally receives a high detection rate since it is directly exposed to the particles arriving from one side. A detector is an endmost detector if the detector is on one end of the detector array.

The third source 631 emits particles 632 which are primarily detected in the endmost long detector 633, since it faces the source 631 with its longest surface without obscuration. The processor can determine from the enhanced detection data in the endmost detector 633 that the third source 631 is located laterally beyond the end of the detector array. It is usually not feasible to determine the source lateral position or distance using only the endmost detector data 633. A high detection rate in an endmost detector can, however, reliably indicate that there is a third source 631 present, that the source 631 is positioned beyond the lateral extent of the detector array, and that the source 631 is generally in the lateral direction of the high-counting endmost detector 633.

The figure thus illustrates how the detector array can detect and localize multiple sources at the same time, how sources in front and behind the detector array can be discriminated, and how a source far outside the field of view can be detected as well.

Figure 7:
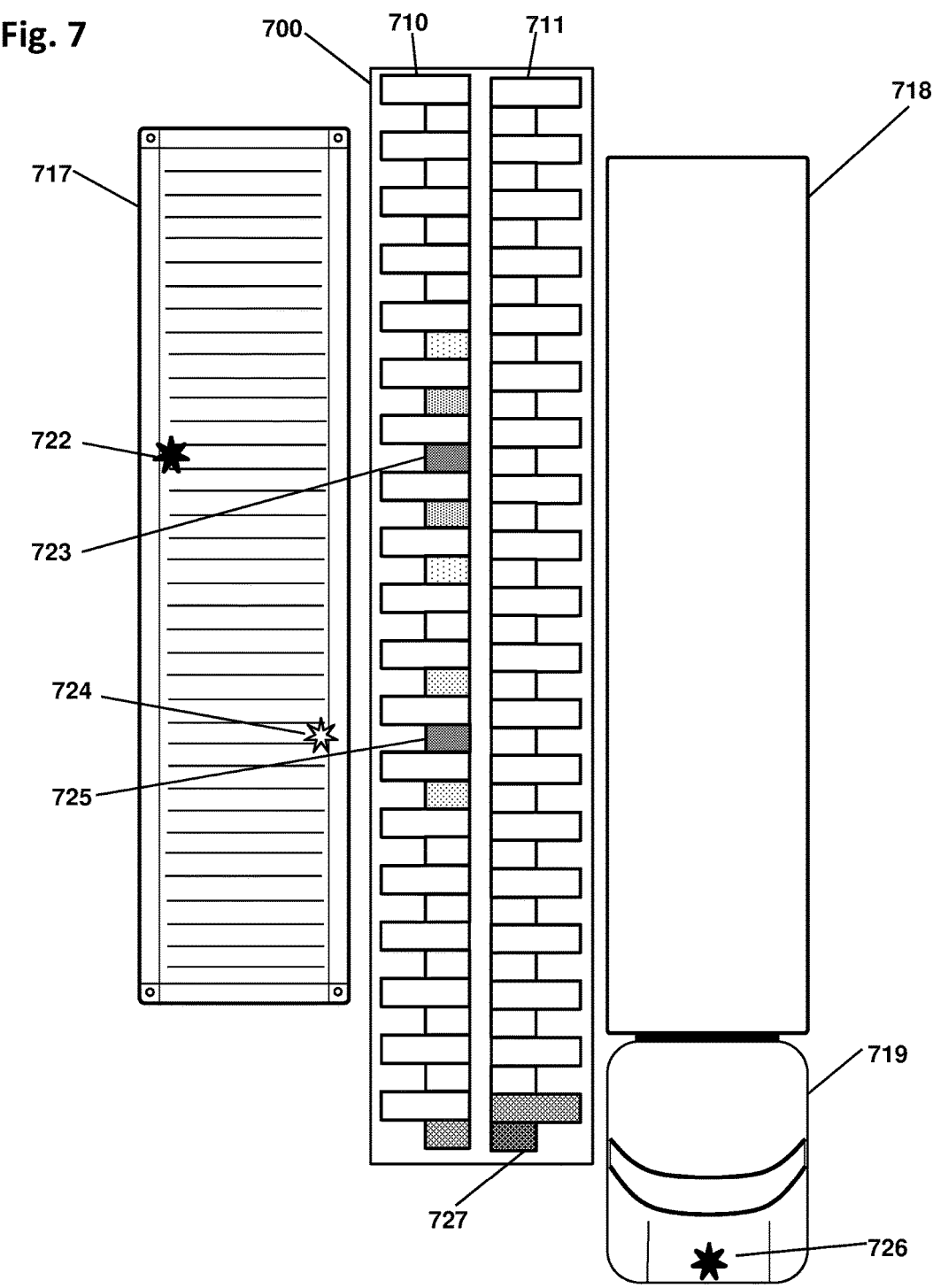
FIG. 7 is a sketch in cross-section of two exemplary detector arrays configured to inspect multiple vehicles simultaneously for radioactive sources according to some embodiments.

FIG. 7 is a cross-sectional top view of an exemplary vehicle inspection station configured to scan two vehicles simultaneously, according to some embodiments. An enclosure 700 contains a left-facing detector array 710 scanning a cargo container 717, and a right-facing detector array 711 scanning a semi-trailer 718. An adversary has placed a heavily shielded clandestine nuclear weapon 722 on the left side of the cargo container 717 among shielding and clutter. The adversary knew which lane of the inspection station is normally used for scanning containers, and so he packed the weapon 722 as far from the left-facing detector array 710 as possible. The adversary has also placed a legal benign source 724 in the cargo container 717, and has declared the legal source 724 on the manifest, the intent being to confuse the radiation scan so it would miss the weapon 722. However, the left-facing detector array 710 has defeated the obfuscation attempt by successfully detecting both the weapon 722 and the legal source 724, according to the two detection peaks centered on the particular short detectors 723 and 725 respectively. Since two narrow detection peaks are observed in the left-facing array 710, this indicates that two sources 722 and 724 are in the cargo container 717. The lateral position of the weapon 722 was determined according to the lateral position of the detection peak of the particular short detector 723, and the lateral position of the legal source 724 was determined according to the lateral position of the second peak related to particular detector 725. Therefore the officials, seeing two sources in the shipping container 717 whereas only one was declared, may issue an alert.

The semi-trailer 718 is also being scanned, at the same time, by the right-facing detector array 711. The trailer 718 itself is apparently clean, but the tractor 719 includes a hidden pack of radioactive materials 726 which the adversary has placed in the very front in an attempt to avoid detection. In addition, the driver has parked the tractor 719 as far forward as possible, stopping well beyond the end of the detector array 711, in an attempt to avoid detection. However, the endmost detector 727 registers a large excess of detections since it is directly exposed to particles from the radioactive materials 726, and thereby defeats the attempt. Since the high-counting detector 727 is the endmost detector in the array 711, it does not determine the lateral position of the materials 726 precisely, but it does indicate that a third source is present and is positioned beyond the end of the detector array 711.

The examples of FIG. 7 show how embodiments of the detector array 710-711 can detect and localize a shielded weapon 722 and clandestine nuclear materials 726 in two highly adversarial vehicles, simultaneously, despite shielding and deliberate obfuscation.

Figure 8:
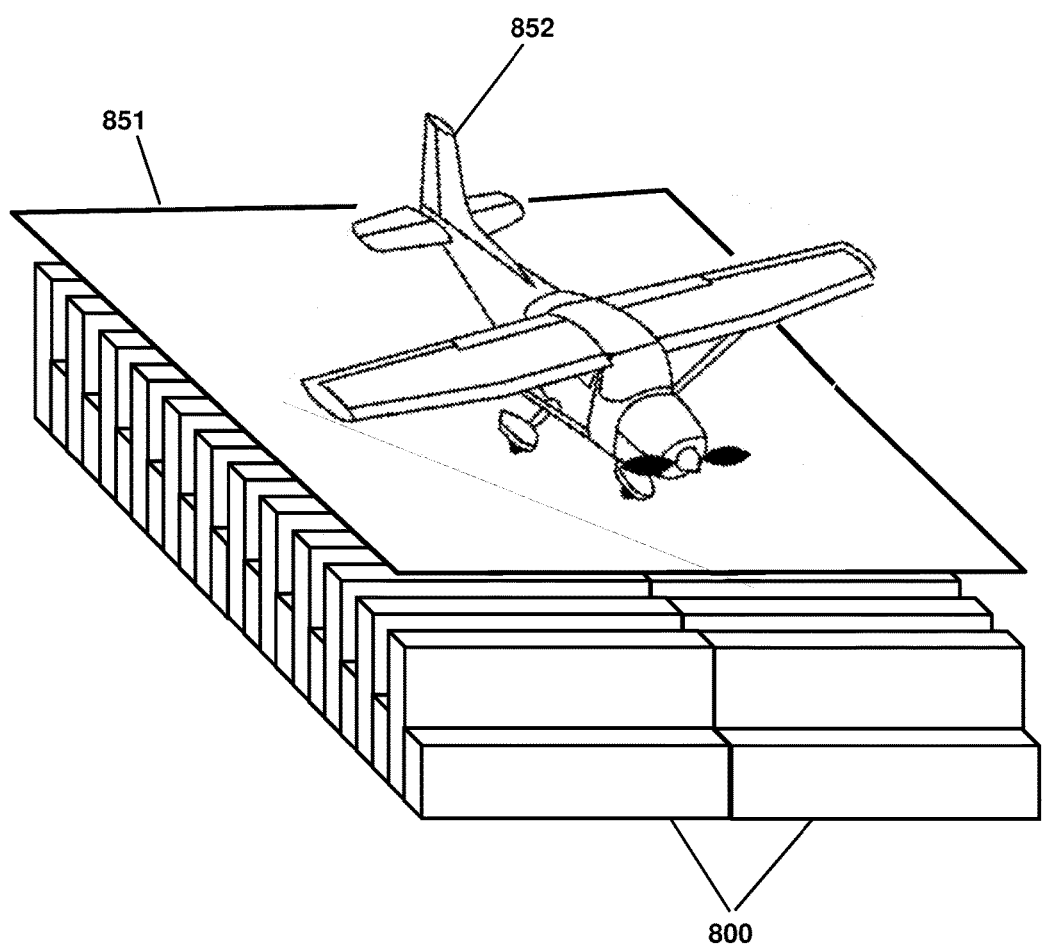
FIG. 8 is a sketch in perspective of an exemplary detector array configured to inspect airplanes for radioactive sources according to some embodiments.

FIG. 8 is a perspective sketch of an inspection assembly including two exemplary detector arrays 800 positioned under a tarmac 851 to scan a small airplane 852, according to some embodiments. An attempt to smuggle nuclear material by air may be detected in such a scan. The exemplary detector arrays 800 are arranged side-by-side to cover the wider area of the airplane 852. Larger freight and passenger planes can be scanned by further extending the detector arrays 800 as needed.

Figure 9:
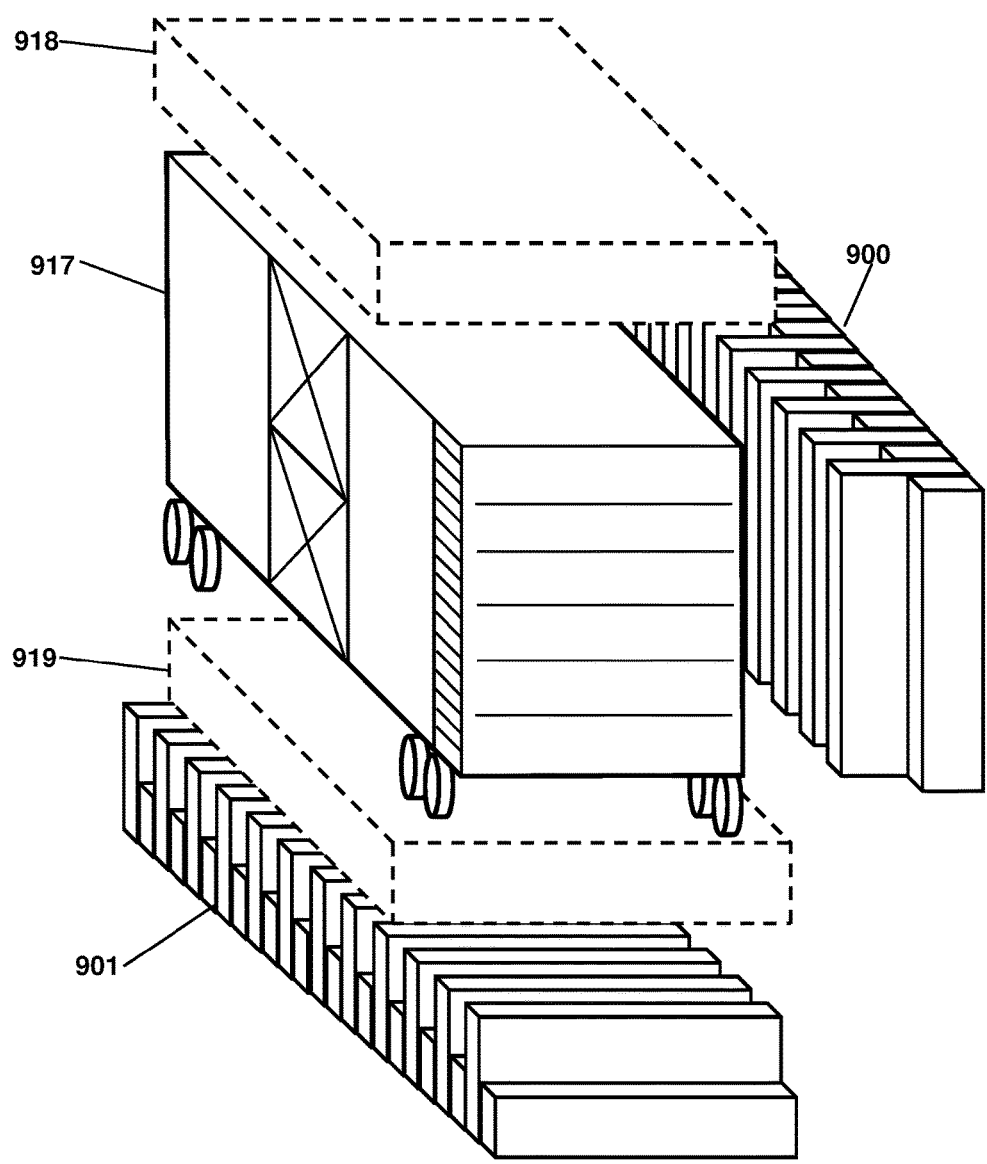
FIG. 9 is a sketch in perspective of an exemplary detector array to inspect vehicles in cooperation with cosmic ray tracking chambers according to some embodiments.

FIG. 9 is a sketch in perspective of two exemplary detector arrays 900-901 for inspecting a railroad freight car 917 or other vehicle or container, according to some embodiments. Also shown in dash are an upper 918 and a lower 919 tracking chamber, each chamber 918-919 being configured to measure naturally-occurring cosmic rays (primarily high-energy muons) that continually pass through the freight car 917 from above. The tracking chambers 918-919 may include scintillators or gaseous ionization detectors such as those presented in FIGS. 12A-12G below. The tracking chambers 918-919 may be configured to precisely measure the tracks of the cosmic rays and thereby detect any large-angle scattering of the cosmic rays. Large-angle scattering of cosmic rays is an indication of the high-Z components of a nuclear weapon and its high-density shielding.

In some embodiments, the detector arrays 900-901 may be configured to detect radiation from the freight car 917 and to localize any sources detected, while the cosmic ray tracking chambers 918-919 detect the high-Z weapon components by cosmic ray scattering. One detector array 900 is shown positioned just outside the field of view of the tracking chambers 918-919 and the other detector array 901 is shown below the lower tracking chamber 919, positioned so as to avoid introducing additional scattering of the cosmic rays until after they pass through the lower chamber 919.

Alternatively, the detector arrays 900-901 may be positioned closer to the freight car 917 and within the field of view of the tracking chambers 918-919, while a processor associated with the tracking chambers 918-919 may be configured to account for the extra scattering of any cosmic ray tracks that pass through the detector array 900 or 901, or to reject such events. On the other hand, such a correction may not be necessary because the detector arrays 900-901 typically include low-Z, low-density materials such as plastic scintillator or thin boron foil. Thus, the detector arrays 900-901 may cause such minimal scattering that there may be no need to correct for the incremental scattering of cosmic rays that pass through the detector arrays 900-901. Additional detector arrays may be positioned on the other side of the freight car 917, or above the upper tracking chamber 918 and facing down, for additional radiation detection coverage while avoiding any interference with the cosmic ray measurement.

In some embodiments, a detector array and a tracking chamber may be combined, so that the detectors of the detector array may be configured to detect radiation from the inspection object and simultaneously to track cosmic ray particles from above. Such a system may provide both a radiation detection function and a cosmic ray scattering function in the same system. For example, a cosmic ray tracking chamber comprising proportional detectors may be in the form of stacked tubular proportional detectors with a central anode wire, or as planar foil cathodes interleaved with wire grid anodes. To provide a simultaneous detection capability for low-energy neutrons, the interior surfaces of the tube walls, or the surfaces of the foil cathodes, may include a thin layer of neutron-capture material, such as $^{10}$B or $^6$LiF for example. The neutron-capture layers are preferably thin enough that neutron-capture ions can escape from the layer and ionize the fill gas, thereby producing a signal indicating that a neutron was detected. To detect high-energy neutrons, a moderator such as HDPE (high-density polyethylene) or oil or water may be added. To detect gamma rays, a high-Z converter layer may be added. The high-Z converter layer may also serve to distinguish cosmic ray electrons from muons, which scatter differently.

An advantage of the combined radiation detection and cosmic ray scattering systems is that together they leave an adversary with no design space for concealing a weapon or other contraband nuclear material. If the adversary increases the amount of shielding in an attempt to limit the detectable radiation signal, then the extra shielding would cause further cosmic ray scattering which the tracking chambers 918-919 readily detect. If the adversary attempts to minimize the scattering by using less shielding, the radiation detector arrays 900-901 would then quickly detect and localize the source. Thus, the combined system can detect radiological weapons, plutonium-based nuclear weapons, and uranium-based nuclear weapons, despite shielding and clutter.

Figure 10:
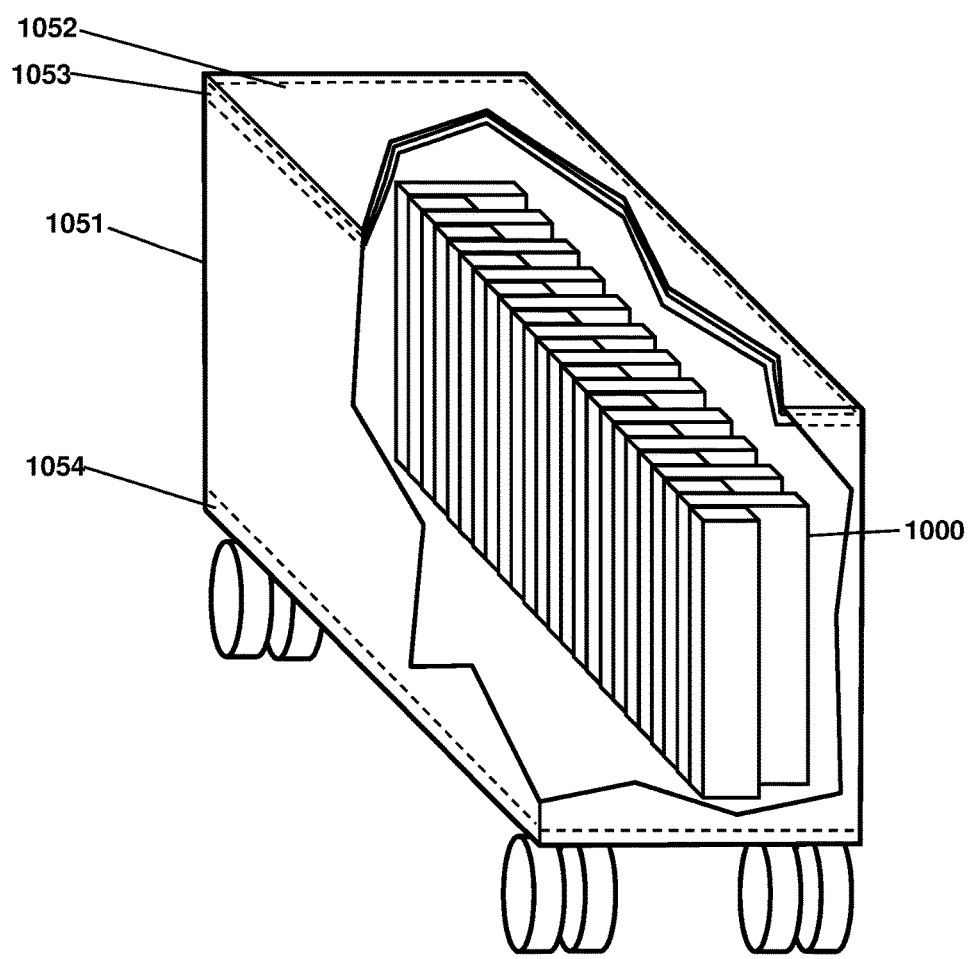
FIG. 10 is a sketch in perspective, partly cut-away, of an exemplary detector array installed in a mobile scanner for detecting hidden radioactive sources according to some embodiments.

FIG. 10 is a sketch in perspective, partly cut-away, of an exemplary mobile scanner of the type that may be driven around a region, such as an urban region, to detect and localize any hidden weapons or unexpected radiation. In some embodiments, the detector array 1000 may be installed in a van or trailer 1051 or other vehicle, and oriented to detect radioactive sources on the curb side while the vehicle is driven in motion around the inspection area, or alternatively positioned at strategic locations to scan suspicious buildings from a distance. The embodiment depicted includes a ceiling scintillator 1052 configured to reject any events coming from cosmic rays. The embodiment further includes a layer of cadmium neutron shielding clad in polyethylene on the top 1053 to moderate and capture low-energy neutrons from cosmic rays, and a second neutron shield 1054 on the bottom to block ground-effect neutrons. In some embodiments, the trailer 1051 may be configured to admit the particles with minimal absorption, such as plastic or aluminum walls configured to block less than a small fraction, such as 2% or 5% or 10% or 20%, of the orthogonally incident particles.

Figure 11:
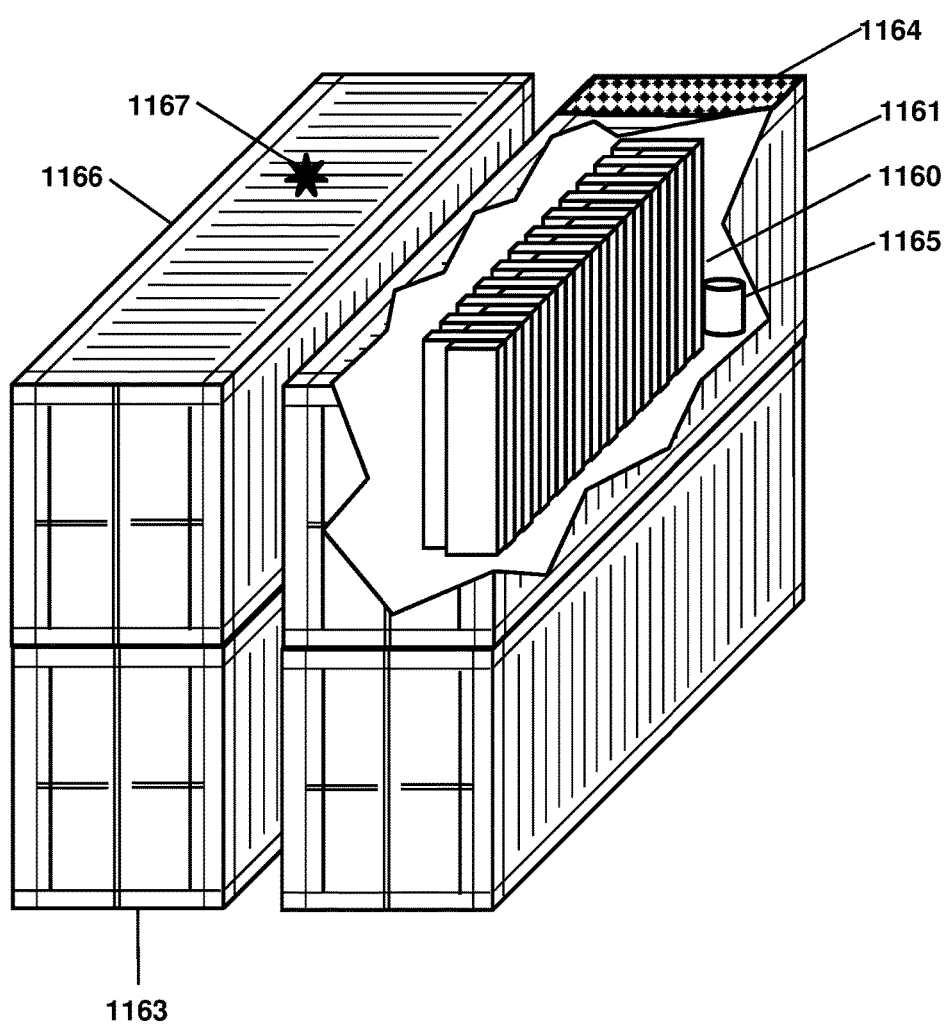
FIG. 11 is a sketch in perspective, partly cut-away, of an exemplary detector array mounted in a shipping container for inspecting other shipping containers according to some embodiments.

FIG. 11 is a perspective sketch of an exemplary inspection device for performing a sensitive detection of any radioactive material in, for example, a shipping container. Since the entry scan at a shipping port lasts only 1 minute typically, a well-shielded source may be missed. The depicted device includes a detector array 1160, mounted in an enclosure 1161 such as a shipping container (shown partly cut-away), according to some embodiments. The enclosure 1161 may be stackable and fork-lift-portable, and so can be stacked near an inspection object 1166 such as a truck or another shipping container for a longer, high-sensitivity inspection. In some embodiments, the enclosure 1161 may be configured to pass most of the particles, such as having a thin wall on one side that blocks no more than 2% or 5% or 10% or 20% of the orthogonally incident particles. In some embodiments, the detector array 1160 may be configured to face upward or downward, so as to inspect an inspection object 1166 which is stacked above or below the enclosure 1161. By acquiring data for a longer term, such as one hour or longer, the detector array 1160 can detect even highly-shielded sources, according to some embodiments. In the depicted case, the inspection object 1166 is another shipping container which contains highly-shielded nuclear components 1167. The detector array enclosure 1161 and the inspection object 1166 container may be stacked on top of other benign containers 1163, as is common practice at shipping ports. In this example, the detector array 1160 can detect particles that suspiciously come from a single location in the target container 1166, thereby revealing the nuclear components 1167. The depicted detector array 1160 and its enclosure 1161 may be useful for taking long and highly sensitive scans of suspicious vehicles or containers while waiting in a shipping port or border crossing, for example. Often the containers are stacked and held in the port yard for 1 or 2 days, or up to a week, during which time the detector array 1160 can detect even low-intensity or well-shielded threat materials, according to some embodiments. Also shown is a photovoltaic solar panel 1164 (checkerboard hatch) which may be mounted on the top of the enclosure 1161 as shown, or it may be detachable and remountable on a side of the enclosure 1161 so as to improve the sunlight exposure. The panel 1164 may be configured to provide electrical power to run the detector array 1160. Also shown is a rechargeable battery 1165 which may be configured to be recharged by the panel 1164, or otherwise recharged by some electrical source, and to provide power to the detector array 1160 at night or whenever the photovoltaic panel 1164 is obscured. Such a self-contained power system may be safer and more convenient than running extension cords around a port yard which is generally busy with vehicle traffic night and day.

Figure 12A:
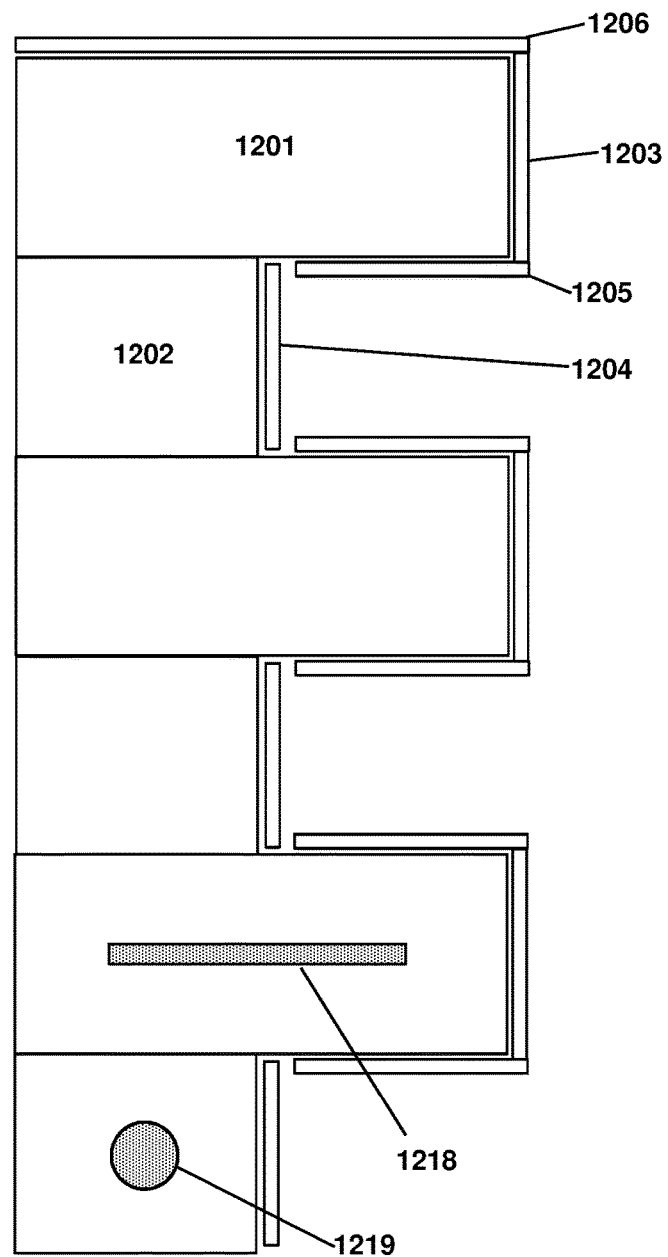
FIG. 12A is a cross-section sketch of an exemplary detector array including thin counters mounted peripherally to detect different particles according to some embodiments.

FIG. 12A is a cross-section sketch of an exemplary assembly including a detector array including long detectors 1201 and short detectors 1202, plus a number of thin additional surface detectors termed "counters" herein. In some embodiments, the counters include front-outer counters 1203 mounted on the front surfaces of the long detectors 1201 and front-inner counters 1204 mounted on the front surfaces of the short detectors 1202. The counters may further include front-parallel counters 1205 mounted on the exposed sides of the long detectors 1201. Finally, the counters may include endmost counters 1206 mounted on the outside surfaces of the endmost detectors 1201 or 1202. Thus, the various counters 1203-1206 may nearly surround the detectors 1201-1202 as depicted in FIG. 12A. The processor may be configured to detect and localize a first source according to a detection peak in the short detectors 1202, and to detect and localize a second source (or the same source) according to a detection peak in the front-inner counters 1204 for example. Likewise, the processor may be configured to detect a first source located beyond the direct field of view of the detector array according to enhanced detection in an endmost detector 1201 or 1202, or to detect the source according to enhanced detection in an endmost counter 1206. Thus the counters 1203-1206 may provide confirming or contrasting data about source locations relative to data provided by the detectors 1201-1202.

In some embodiments, each counter 1203-1206 may be substantially thinner than the detector thickness, to avoid blocking particles from reaching the detectors 1201-1202. For example, the counter thickness may be in the range of 1-10 mm while the detector thickness may be 10-40 cm, according to some embodiments. The counter thickness may be related to the detector thickness, such as about 1% to 2% of the detector thickness to avoid blocking the particles, or 5% to 10% of the detector thickness for improved detection efficiency in the counters.

In some embodiments, the counters 1203-1206 may be configured to detect different particle types than the detectors 1201-1202. For example, counters of LYSO scintillator can detect gamma rays, while detectors of ZnS-based scintillator can detect neutrons. The neutrons easily pass through the LYSO counters, and ZnS detectors are nearly gamma-blind. Therefore, the detectors 1201-1202 can detect neutrons exclusively, while the counters 1203-1206 can detect gammas exclusively.

Alternatively, the counters 1203-1206 may be configured to detect neutrons while the detectors 1201-1202 may be configured to detect gamma rays. For example, the counters 1203-1206 may be acrylic loaded with microbeads of $CaF_2$ scintillator containing Li or B converters to detect low-energy neutrons by capture, while the detectors 1201-1202 may be liquid scintillator configured to detect gammas by Compton scattering. A single light sensor such as a photomultiplier tube may view one of the detectors 1201-1202 and one of the counters 1203-1206 at the same time, with signal separation by pulse-shape analysis to separate the 5 ns pulses of the organic scintillator detectors 1201-1202 from the 900 ns pulses of the inorganic counters 1203-1206 in this example.

In some embodiments, the counters and detectors may be configured to detect the same types of particles but with different energies. For example, the counters 1203-1206 may be planar semiconductors with a thin LiF converter layer to detect thermal neutrons, while the detectors 1201-1202 may be PMMA loaded with microbead scintillator (without Li or B converters) to detect high energy neutrons by proton recoil. The high energy neutrons readily pass through the thin counters without interacting, and the low energy neutrons tend not to interact with the detectors since there are no nuclides with high absorption cross-sections.

Alternatively, to detect two different energies of gamma rays, the counters 1203-1206 may be $CdWO_4$ configured to detect 100-200 keV gamma rays by photoelectric absorption, while the detectors 1201-1202 may be plastic scintillator configured to detect 1 MeV gamma rays by Compton scattering. In each case, the counters 1203-1206 can detect a low-energy component of a particle type while the detectors 1201-1202 can detect the high-energy component, or vice versa in other embodiments. Detecting multiple particle types or multiple energy ranges may be valuable for identifying a shielded weapon since the shielding often converts the initially high-energy particles to lower-energy particles by scattering.

In some embodiments, the counters 1203-1206 may be able to reveal a source that the detectors 1201-1202 may miss. For example, a well-shielded uranium bomb may emit only 100-200 keV photons which may be too low in energy for PVT-based detectors 1201-1202 to detect, but are easily picked up by a set of bright high-density LYSO counters 1203-1206. In addition, the counters 1203-1206 may provide a continuous measure of the natural background radiation such as epithermal neutrons from atmospheric cosmic ray interactions at an inspection site, while the detectors 1201-1202 continuously search for high-energy particles from nuclear weapon materials. In addition, the counters 1203-1206 may shield the detectors 1201-1202 from low-energy neutrons by absorbing and detecting the low-energy neutrons before they can reach the detectors 1201-1202. Then, high-energy neutrons may pass readily through the counters 1203-1206 and may be moderated and detected in the detectors 1201-1202 without the interference of the ambient low-energy neutron component.

Also shown are two exemplary embodiments of embedded detectors 1218 and 1219 which may be embedded or otherwise positioned in the detectors 1201 and 1202. Each embedded detector 1218 and 1219 may include a detection material configured to detect different particle types and/or different energy ranges relative to the detectors 1201 and 1202. The embedded detectors 1218 and 1219 may be of any shape, such as a flat or planar shape 1218 as shown, or a cylindrical shape 1219 as viewed from the top. Each detector 1201 and 1202 may contain one embedded detector 1218-1219 or multiple embedded detectors 1218-1219. In some embodiments, the detectors 1201-1202 may include hydrogenous scintillator such as plastic or liquid scintillator configured to detect gamma rays as well as recoil protons in the hydrogenous scintillator. The hydrogenous scintillator may also moderate or slow down neutrons by scattering. The embedded detectors 1218-1219 may include a neutron-specific scintillator such as a ZnS—LiF blend in a transparent PMMA matrix with a wavelength shifter, and may be configured to detect energetic ions emitted by neutron-capture reactions. Since the neutron capture cross section in lithium or boron is large only for low-energy neutrons, the embedded detectors 1218-1219 may be configured to detect only the moderated neutrons. The detectors 1201-1202 may then detect and localize gamma ray sources and may moderate or thermalize incoming fast neutrons, and the embedded detectors 1218-1219 may detect those neutrons and thereby detect the presence of neutron sources. Thus, the system may indicate the location of the source using gamma rays and may also indicate whether the source also emits neutrons, which is a valuable piece of information for an inspector. If the detectors 1201-1202 are configured to produce different signals from the embedded detectors 1218-1219, both may be viewed by a shared light sensor. Alternatively, separate light sensors may view the detectors 1201-1202 and the embedded detectors 1218-1219 separately. The detectors 1201-1202 may be configured to emit a first signal upon detecting a recoil proton, and a second signal different from the first signal upon detecting the ions from a neutron capture event. The processor may be further configured to determine that a fast neutron has been detected when the hydrogenous scintillator emits a first pulse of light (due to proton recoil events), followed within a period of 1 to 50 microseconds by the neutron-sensitive scintillator light pulse (due to capture ions). This sequence indicates that a fast neutron has entered the hydrogenous scintillator, scattered one or multiple times from the hydrogen nuclei, thereby launching recoil protons into the hydrogenous scintillator, and then the neutron was captured in nuclides comprising or proximate to the neutron-specific scintillator, thereby launching one or more energetic ions which can be detected in the neutron-specific scintillator. In this way, the configuration can localize the source using the gamma ray signals, and also indicate whether the source also emits neutrons.

Figure 12B:
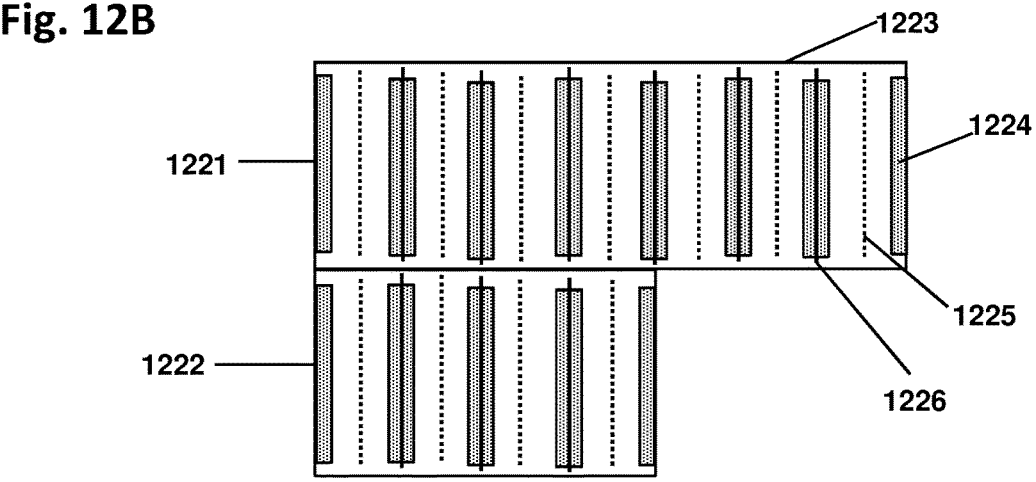
FIG. 12B is a cross-section sketch of an exemplary detector array including neutron capture electrodes in a gaseous ionization chamber according to some embodiments.

FIG. 12B is a cross-section sketch of a portion of an exemplary detector array including long 1221 and short 1222 detectors. Each detector 1221-1222 may be a gaseous ionization type detector, configured to detect low-energy neutrons. For example, each detector 1221-1222 may include a gas-tight enclosure 1223 containing a gas, a plurality of thin layers of a neutron-capture nuclide 1224 (stipple), wire grids 1225 at high positive voltage, and foils 1226 on which further neutron-capture layers 1224 are deposited. The layers 1224 may be thin enough that neutron-capture ions (such as tritons and alpha particles) can escape from the layer 1224 and enter the gas region, causing ionization in the gas. The gas, such as P-10 or other cascade or proportional counter gas, may be configured to allow the ionization electrons to drift toward the wire grids 1225 and avalanche there, creating a negative pulse signal. For additional detection efficiency, the gas may include a neutron-capture nuclide such as $^3$He or $^{10}$BF$_3$ for example. The foils 1226 may include electrically conducting layers or ultra-thin (50-200 nm) coatings such as aluminum, and may be at a negative voltage relative to the wire grids 1225. Each detector 1221-1222 may comprise a plurality of sections, each section including a wire grid 1225 and the immediately adjacent layers 1224 of neutron-capture material. The number of sections in each detector 1221-1222 may depend on the size of the detector 1221-1222, and on the spacing between the wire grids 1225 and the adjacent layers 1224. In some embodiments, the number of sections may be 3 or 5 or 10, and may be as high as 20 to 50 when there is sufficient room. Higher detection efficiency may be obtained with a larger number of sections. In addition, the layers 1224 in the long detector 1221 may absorb low-energy neutrons from certain angles, thereby serving as collimators for the short detectors 1222. The processor may then determine a detection peak among the short detectors 1222 and thereby determine the lateral position or distance or angle of the source of low-energy neutrons.

Figure 12C:
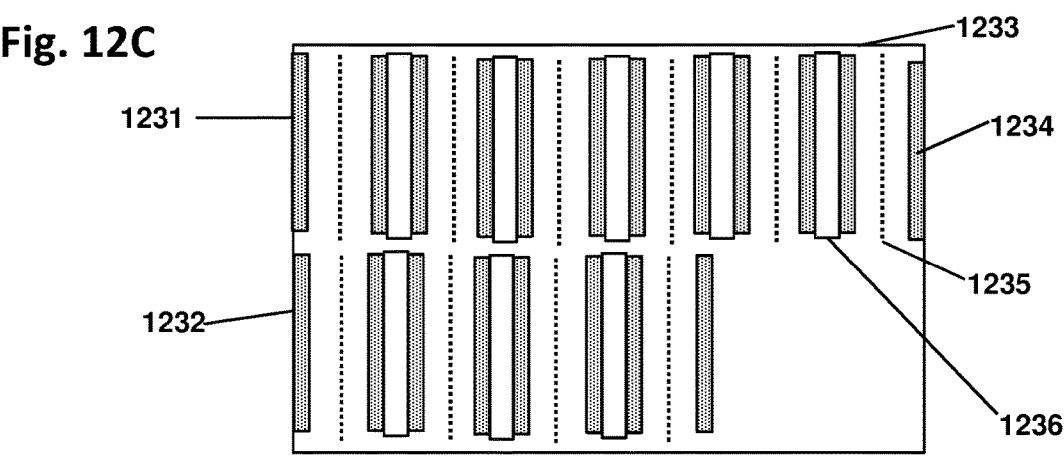
FIG. 12C is a cross-section sketch of an exemplary detector array including neutron capture electrodes with a moderator layer in a gaseous ionization chamber according to some embodiments.

FIG. 12C is a cross-section sketch of a portion of an exemplary detector array for detecting high-energy neutrons. Unlike the configuration of FIG. 12B, the enclosure 1233 now encompasses both the long 1231 and short 1232 detectors. Such an encompassing enclosure 1233 may reduce weight and costs. Multiple long and short detectors may be enclosed in such an enclosure, further simplifying the arrangement. For example, the enclosure 1233 may contain additional long and short detector configurations similar to those depicted, encompassing 2 or 5 or 10 or more long and short detectors 1231-1232 in alternation. The enclosure 1233 may enclose the entire detector array in a single gas-tight container, thereby simplifying construction.

Each detector 1231-1232 may include a plurality of sections comprising a wire grid 1235 facing opposite layers 1234 of neutron-capture material. In addition, to enable detection of high-energy neutrons, the detectors 1231-1232 may include moderator panels 1236, which in this case are sandwiched between layers of neutron-capture material 1234 on both sides. The moderator panels 1236 may comprise a hydrogenous material such as polyethylene or other polymer or other hydrogenous material for example, positioned to scatter and moderate high-energy neutrons, thereby turning them into low-energy neutrons that can then be captured in the neutron-capture layers 1234. The long detectors 1231 may block the high-energy neutrons from various angles, thereby serving as collimators for the short detectors 1232. The processor may then determine a detection peak among the short detectors 1232 and thereby determine the lateral position or distance or angle of the source of high-energy neutrons.

Figure 12D:
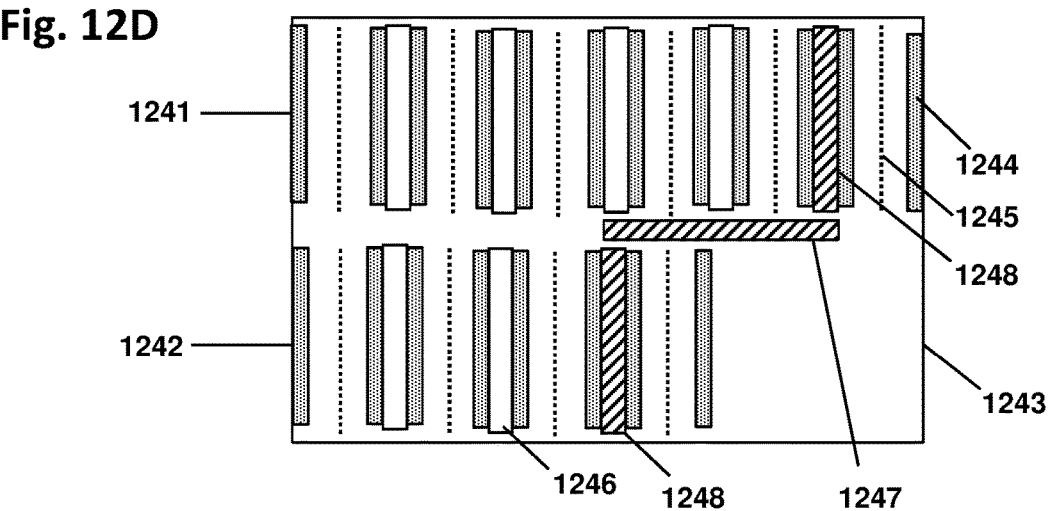
FIG. 12D is a cross-section sketch of an exemplary detector array including neutron capture electrodes with a moderator layer and neutron absorbers in a gaseous ionization chamber according to some embodiments.

FIG. 12D is a cross-section sketch of a portion of an exemplary detector array including long 1241 and short 1242 detectors within a common gas enclosure 1243 and configured to detect fast and slow neutrons separately. Each detector 1241-1242 may include a plurality of stages comprising one or more layers 1244 of a thin neutron-capture material such as boron or lithium, configured to allow neutron-capture ions to escape from the layer 1244 into the adjacent gas. One or more wire grids 1245 are placed at high positive voltage between the layers 1244. The wire grids may be configured to attract electrons generated by ionization in the gas, and may cause electron avalanches at the wires 1245, thereby generating an electrical signal. In addition, some of the stages may include a moderator layer 1246, which may be proximate to one or more of the layers 1244 as shown, and may be configured to moderate or slow down high-energy neutrons to promote capture reactions in the layers 1244. In addition, a neutron absorber 1247 (such as cadmium) may be placed between the long 1241 and short 1242 detectors to prevent low-energy neutrons from passing between the two detectors 1241-1242. In addition, a neutron filter 1248 (such as cadmium) may be placed in the long and short detectors 1241-1242. The filters 1248 may be configured to separate various regions of the detectors, for example a first region where incoming low-energy neutrons may be detected, and a second region where high-energy neutrons may be moderated and detected. For example, incoming low-energy neutrons are likely to be captured by the frontmost layers 1244 and detected in the first wire grid 1245 in each detector 1241-1242. Any low-energy neutrons that are not captured in the frontmost section are likely to be absorbed in the absorber 1247. High-energy neutrons, on the other hand, are likely to pass through the front section and the absorber 1248 without interaction, and may then reach the downstream moderators 1246, where they are moderated and then detected. Thus the high-energy neutrons may be detected in sections behind or after the filter 1248, whereas the low-energy neutrons may be detected in sections frontward of the filter 1248. By separately detecting high-energy and low-energy neutrons in different regions of the detectors 1241-1242, the processor may detect and localize one or more sources simultaneously. This may be useful when a threat item, producing high-energy neutrons, may be present along with low-energy environmental background neutrons.

Figure 12E:
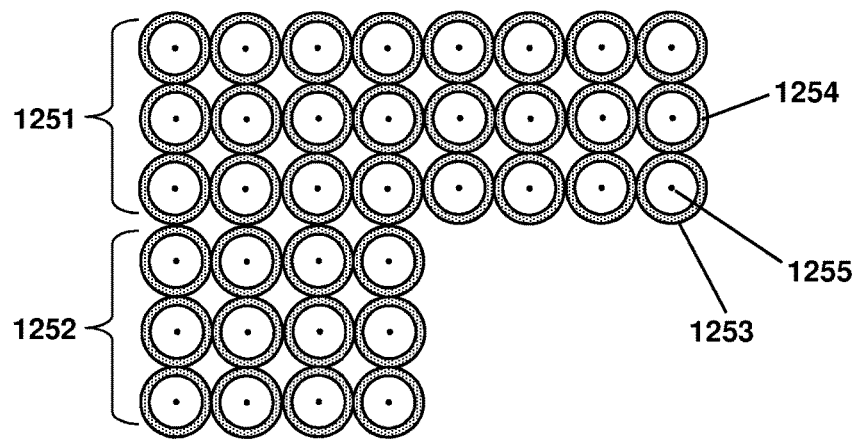
FIG. 12E is a cross-section sketch of an exemplary detector array including tubular neutron capture gaseous ionization chambers according to some embodiments.

FIG. 12E is a cross-section sketch of a portion of an exemplary detector array including long 1251 and short 1252 detectors comprising tubular gaseous ionization detectors 1253, such as proportional detectors, configured to detect low-energy neutrons. Each tubular detector 1253 may include a central high-voltage wire 1255 surrounded by a gas such as P-10 (which may also include a neutron-capture nuclide such as ³He or ¹⁰BF₃) within a tube such as an aluminum or stainless-steel tube coated on the inside with a thin neutron-capture layer 1254 such as B₄C or LiF (stipple). The tubular detectors 1253 may be stacked in a rectangular pattern as shown, or a hexagonal close packing, or other arrangement. The tubular detectors 1253 may be round as shown, or hexagonal, or other shape. The tubular detectors 1253 may run in the height direction as shown in this cross-section view, or in the longitudinal direction, so long as they fill the spatial volume corresponding to long and short detectors 1251-1252 so that the long detectors 1251 block low-energy neutrons at various angles and prevent them from reaching the short detectors 1252. The processor may be configured to determine a detection peak among the short detectors 1252 and thereby determine the arrival direction of the low-energy neutrons.

Figure 12F:
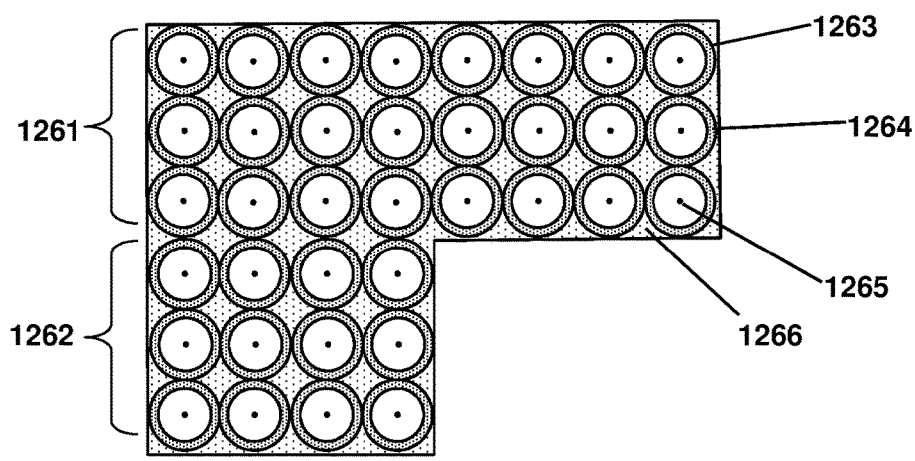
FIG. 12F is a cross-section sketch of an exemplary detector array including tubular neutron capture gaseous ionization chambers embedded in moderator according to some embodiments.

FIG. 12F is a cross-section sketch of a portion of an exemplary detector array including long 1261 and short 1262 detectors comprising tubular gaseous ionization detectors 1263 embedded within a moderator 1266 such as polyethylene, and configured to detect high-energy neutrons. Each tubular detector may include a neutron-capture layer 1264 and a central high-voltage anode 1265 to detect high-energy neutrons after they have been moderated by the moderator 1266.

Figure 12G:
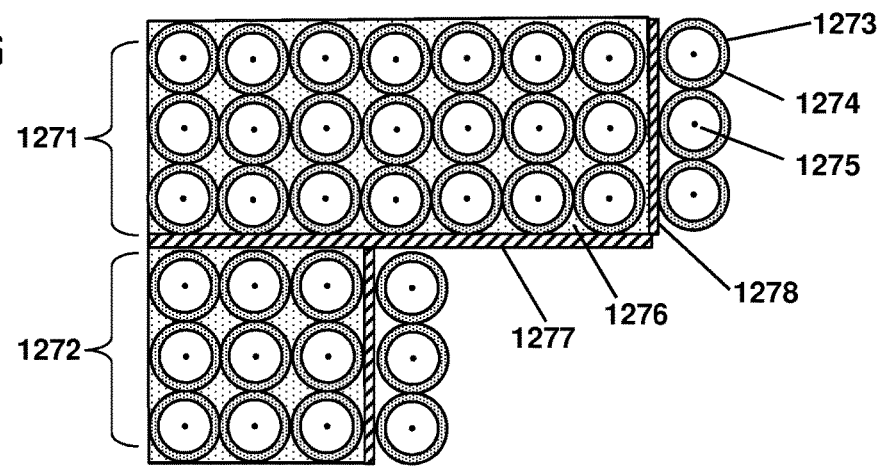
FIG. 12G is a cross-section sketch of an exemplary detector array including tubular neutron capture electrodes gaseous ionization chambers with moderator and absorbers according to some embodiments.

FIG. 12G is a cross-section sketch of a portion of an exemplary detector array including long 1271 and short 1272 detectors comprising tubular gaseous ionization detectors 1273, some of which are within a moderator 1276, and configured to detect low-energy and high-energy neutrons separately. Each tubular detector 1273 may include a neutron-capture layer 1274 and a high-voltage anode wire 1275. Filter layers 1278, such as cadmium, separate the leading tubular detectors 1273 from the moderator 1276. Also, an absorber 1277, such as cadmium, may be positioned between the long and short detectors 1271-1272 to prevent moderated neutrons from passing between the long and short detectors 1271-1272. Thus, low-energy neutrons arriving from the right can be detected in the initial tubular detectors 1273. Any remaining low-energy neutrons that are not captured or scattered can be absorbed in the filter 1278. High-energy neutrons, on the other hand, may pass through the filter 1278 and be moderated in the moderator 1276, and may then be detected. The processor may be configured to determine a low-energy detection peak and a high-energy detection peak according to which detectors are involved. Detections in the short detector 1272 among the tubular detectors 1273 without moderator may thus indicate low-energy arriving neutrons, while detections among the other detectors behind the filter 1278 and embedded in the moderator 1276, may indicate high-energy neutrons. The embodiment depicted can thereby localize a source of high-energy neutrons (such as plutonium) separately from a background of low-energy neutrons.

Figure 13A:
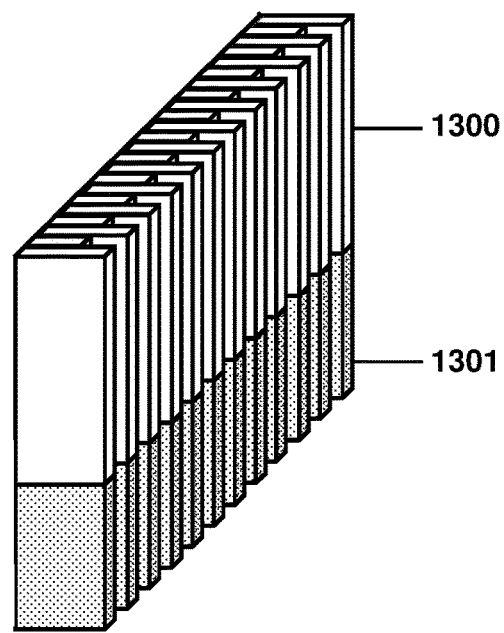
FIG. 13A is a sketch in perspective showing an exemplary assembly of two detector arrays according to some embodiments.

FIG. 13A is a perspective sketch of an exemplary assembly including two detector arrays 1300 and 1301 stacked vertically. In some embodiments, the two detector arrays 1300 and 1301 may be configured to detect different particle types, for example the upper detector array 1300 may be configured to detect gamma rays exclusively, and the lower detector array 1301 may be configured to detect neutrons exclusively. Such an assembly can thereby detect and locate a gamma ray source and a neutron source simultaneously.

Alternatively, in some embodiments the upper and lower detector arrays 1300 and 1301 may be configured to detect the same particle type but with different energy ranges. For example, the upper detector array 1300 may be configured to detect high energy neutrons by proton recoil, and the lower detector array 1301 may be configured to detect low energy neutrons by neutron capture. Such an assembly can thereby detect low energy neutron backgrounds and high energy neutron threat sources simultaneously. As a further alternative, the upper detector array 1300 may be configured to detect high energy gamma rays (>1 MeV) by Compton scattering, while the lower detector array 1301 may be configured to detect low energy gamma rays (100-500 keV) by photoelectric absorption.

Figure 13B:
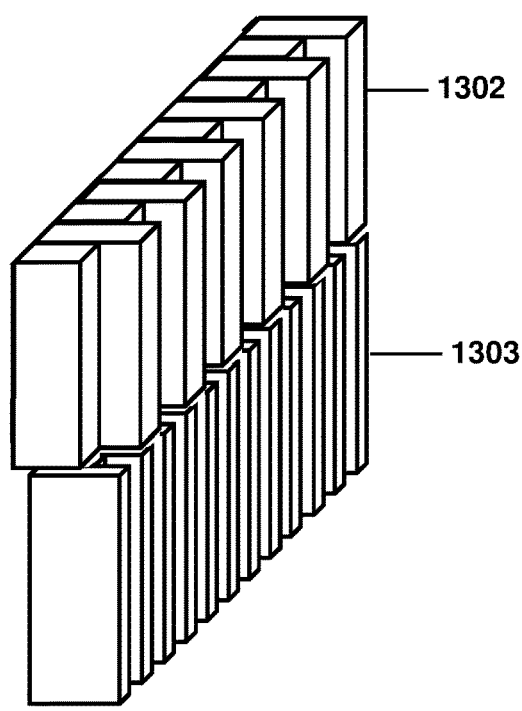
FIG. 13B is a sketch in perspective showing an exemplary assembly of two detector arrays of different designs according to some embodiments.

FIG. 13B is a perspective sketch of an exemplary assembly including two detector arrays 1302 and 1303 stacked vertically, wherein the two detector arrays 1302 and 1303 have different detector thicknesses and different offset distances, among other differences. For example, in some embodiments, the lower detector array 1303 may include an inorganic scintillator such as BGO to detect gamma rays. Due to the relatively short interaction distance of gammas in the high-density BGO, the lower detector array may be optimally configured with a small detector thickness such as 2 cm. The upper detector array 1302 may include PMMA with ZnS to detect high energy neutrons for example, which have a relatively long interaction distance and therefore may require a larger detector thickness of 12 cm in this example. The assembly can thereby detect gamma rays and neutrons efficiently using different thicknesses and other design parameters optimized for each of the detector arrays 1302 and 1303 separately.

Figure 14:
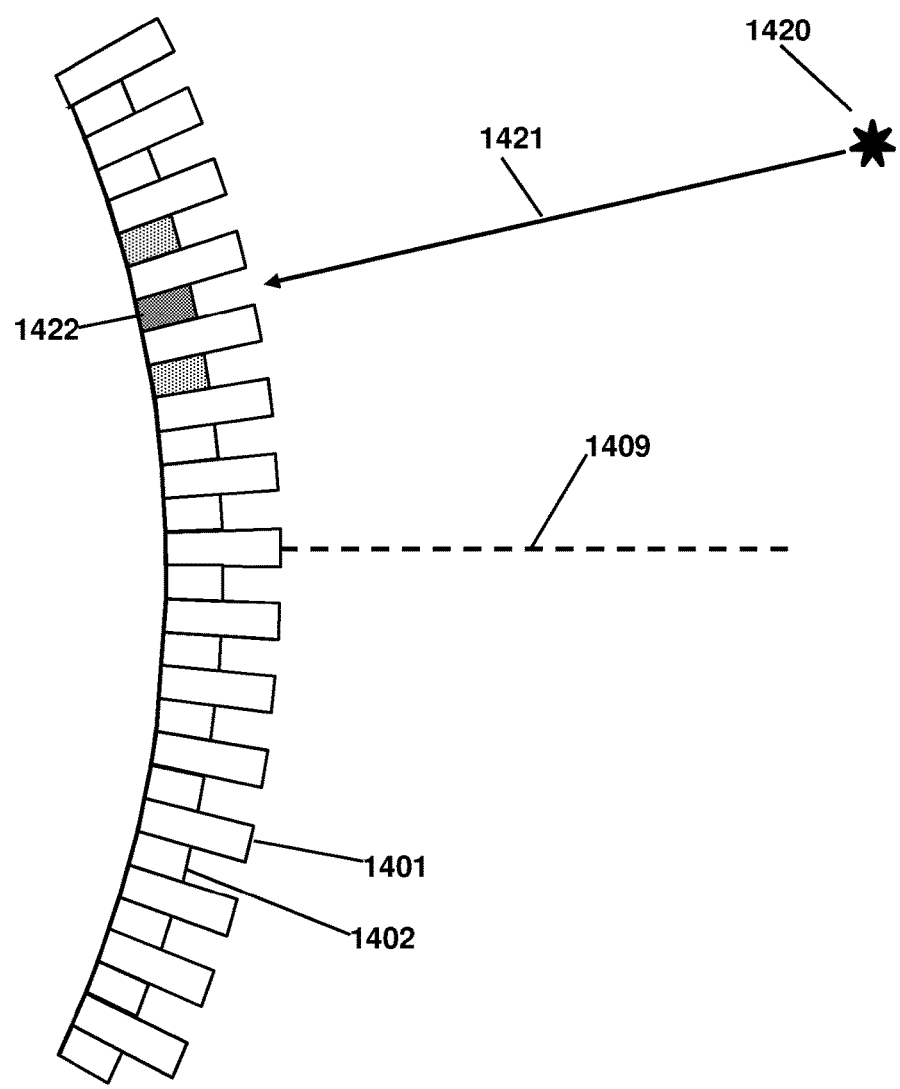
FIG. 14 is a sketch in cross-section of an exemplary detector array in which the detectors are arranged around an arcuate shape according to some embodiments.

FIG. 14 is a top-view cross-section sketch depicting an exemplary detector array with an overall arc shape as viewed from the top, rather than an overall flat or planar shape as in the previous examples. The detectors are shown alternating in size in the radial direction, comprising long detectors 1401 interleaved with short detectors 1402 as viewed by a source 1420 in the front, according to some embodiments. "Front" here is the region facing the convex side and is to the right in the sketch. The aiming plane 1409, shown as a dash line in this top view, is a plane parallel to the major faces of the central detector and parallel to the height direction, while all the other detectors are successively rotated relative to the aiming plane 1409 according to the overall arc shape. Thus, for an arc-shaped detector array, the lateral direction is the direction perpendicular to the central detector in the array, while the other detectors may be oriented at successively larger angles relative to the aiming plane according to the arc shape. If the detectors are slab-shaped with their major faces parallel, then a small triangular or trapezoidal space may be provided between adjacent detectors to accommodate the various orientations of the detectors. Alternatively, the detectors may be configured as nearly slab-shaped but with slightly tilted or non-parallel major faces, such as trapezoids according the arc shape, in which case the adjacent detectors may be positioned with their adjacent major faces being parallel and/or substantially in contact (that is, without the need for triangular gaps between detectors). The aiming plane 1409 is a symmetrically positioned central plane in the arc-shaped detector array as shown. The lateral direction is the direction perpendicular to the aiming plane 1409. A source 1420 in the front area emits particles 1421 which are detected in the detectors 1401 and 1402. A particular short detector 1422 is aligned with the source 1420 and registers a high detection rate, as shown in dark stipple. Its neighboring short detectors are partially obscured or collimated by the long detectors 1401 and thus register lower detection rates. The long detectors 1401 also detect the particles 1421, but have a wide detection distribution based on their geometrical exposure area toward the source 1420 without collimation. The detector array can determine the source angle relative to the aiming plane 1409 according to which short detector 1402 has the highest detection rate.

In contrast to embodiments of detector arrays having an overall flat or straight or planar shape, various embodiments of the arc-shaped version may not provide a determination of the longitudinal distance to the source on the basis of the detection peak width. The detection peak width in these arcuate versions may be primarily determined by the radius of curvature of the arc, and generally not by the source distance. On the other hand, such embodiments may have a much wider field of view than the flat embodiments and thus can accurately localize source directions across a larger region.

Figure 15:
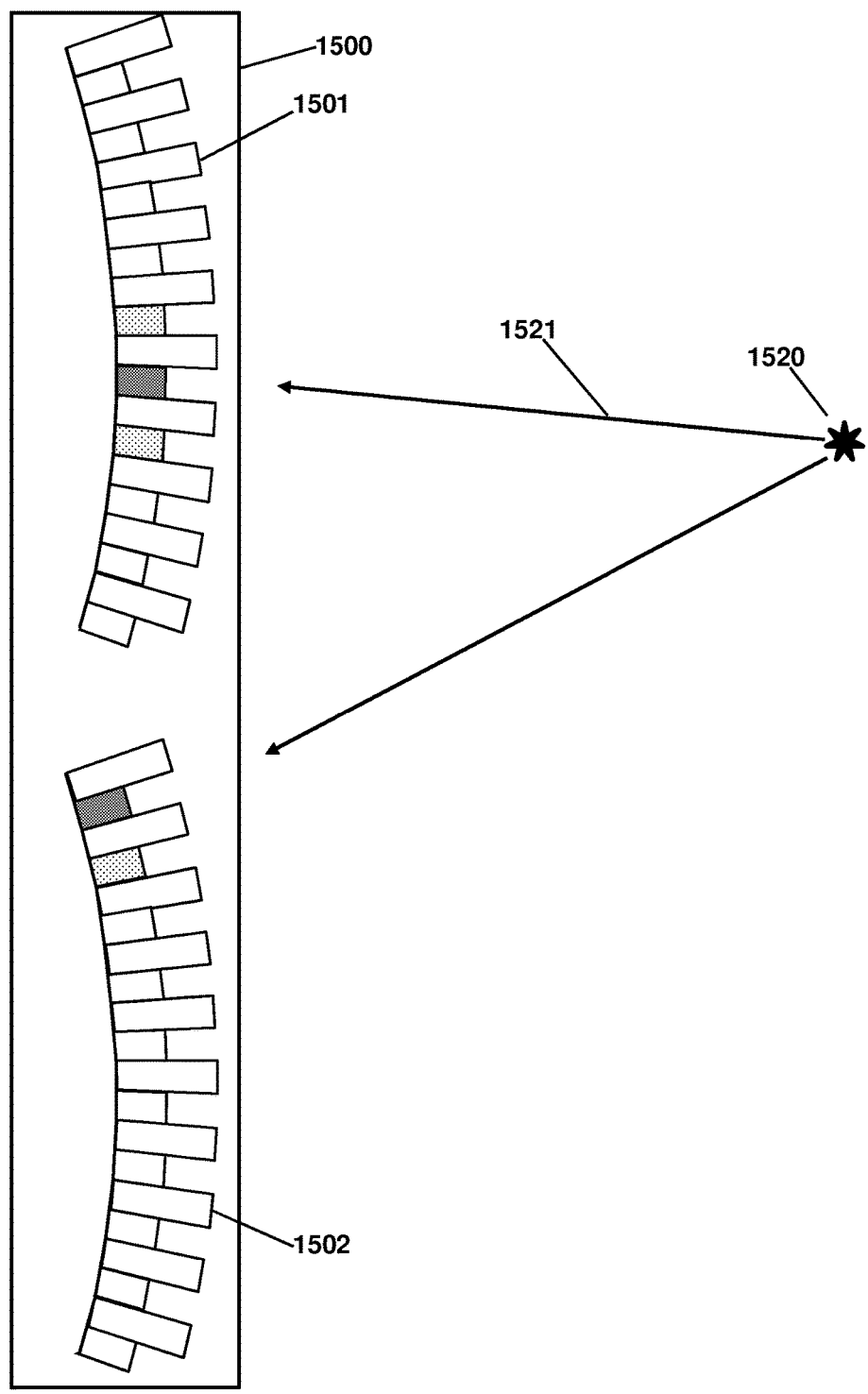
FIG. 15 is a sketch in cross section of an exemplary mobile scanner including two arcuate detector arrays to determine the distance of a source according to some embodiments.

FIG. 15 is a top-view cross-section sketch of an exemplary mobile scanner or a vehicle/cargo inspection station including a pair (two) of detector arrays 1501 and 1502 spaced apart laterally, each having an overall arc shape, mounted in an enclosure 1500 according to some embodiments. Both detector arrays 1501 and 1502 can detect particles 1521 from a source 1520, however, each of the detector arrays 1501 and 1502 has a different detection peak position according to which of the short detectors is aligned with the source 1520. Thus, the position of the detection peak in each detector array 1501 and 1502 can indicate the source angle from a different viewpoint. The difference in the peak positions in the two detector arrays 1501 and 1502 can thereby measure of the distance to the source 1520 by triangulation. In some embodiments, such a dual-arc configuration can simultaneously provide a high angular field of view, front-versus-back determination of the source position, and a separate determination of the source distance. These capabilities may be especially useful for mobile scanners searching for hidden weapons in an area. Preferably, the wall or surface of the enclosure 1500 on the side facing the source 1520 may be configured to block no more than a small portions, such as 2% or 5% or 10% or 20%, of the orthogonally incident particles 1521.

Figure 16:
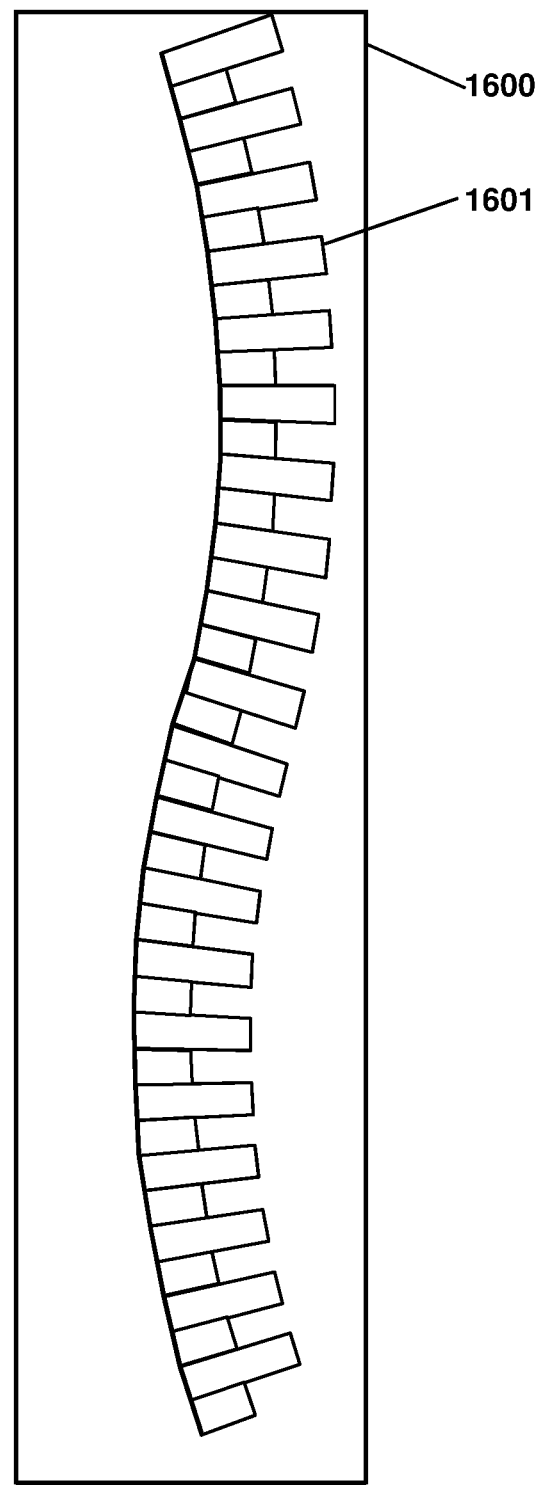
FIG. 16 is a sketch in cross-section of an exemplary mobile scanner including an arcuate detector array that bends in both directions according to some embodiments.

FIG. 16 is a top-view cross-section sketch of an alternative embodiment including an enclosure 1600 containing a detector array 1601 with an overall shape of a compound arc or an "S-shape". Thus the detector array 1601 includes curvature in both frontward and rearward directions. As discussed in FIG. 15, the two regions of the S-shaped detector array 1601 can determine the source angle, source distance, and the front-versus-back region of the source according to the detection peaks in the detector array 1601. In some embodiments, the enclosure 1600 (or a portion facing an inspection region) may be configured to block less than 2% or 5% or 10% or 20% of the particles incident orthogonally thereon. For example, if the detector array 1601 is configured to detect gamma rays, the enclosure 1600 may include plastic which has low attenuation for gamma rays. If the detector array 1601 is configured to detect neutrons, the enclosure 1600 may include steel which readily passes neutrons. If the detector array 1601 is configured to detect both gamma rays and neutrons, the enclosure 1600 may include aluminum or a carbon-carbon composite material, either of which can be configured to pass most or almost all of the incident particles.

FIG. 17 is a flowchart showing an exemplary method for determining source parameters from detection data, according to some embodiments. First 1701, detection signals may be acquired for a period of time from all the detectors including the short and long detectors. Then 1702, the particular short detector that has the highest detection rate may be identified. Then 1703, optionally (in dash) the detection distributions in the short and long detectors may be compared, thereby determining whether the source is in front or in back of the detector array.

The detection data may then be checked to determine whether the highest value is in one of the end detectors 1704. If the highest-counting detector is not an end detector (that is, the maximum detection is somewhere internal among the detectors), then the source is known to be within the field of view of the short detectors. In that case 1705, optionally, the detection peak may be fit to a curvature or shape function, so as to more precisely determine the centroid of the detection peak. Alternatively, the fitting operation may be skipped, in which case the lateral position of the highest-counting short detector may be used as the detection peak location. Then 1706, optionally, the detection peak location may be compared to a predetermined lateral position correlation function that relates the lateral position of the source to the detection peak location, from which the lateral position of the source is directly determined. Alternatively, with only minor reduction in accuracy, the lateral position of the source may be set equal to the lateral position of the detection peak.

Then 1707, the detection peak width may be determined, based on a fit such as a parabolic fit, or based on the full width at half-maximum, or using an empirical peak curvature criterion, or other measure of the detection peak width. The detection peak width may then be compared to a predetermined peak-width correlation function that relates the distance of the source to the width of the detection peak, from which the source distance may be directly obtained. As mentioned, the peak-width correlation function is a predetermined set of data that relates the source distance to the width of a detection peak, and can be prepared by measuring the width of a detection peak for various distances of a test source using techniques well known in the art. Then 1708, the source lateral position and distance may be displayed or recorded or transmitted or otherwise reported.

Returning to step 1704, if the maximum detector rate is in one of the endmost detectors, then the source is apparently positioned beyond the end of the detector array, in which case the angle of the source may be determined 1709 by fitting the distribution of detections in the long detectors to a slope function. Then 1710, the slope may be compared to a predetermined slope correlation function comprising data that relates the source angle to the slope, and thereby determines the source angle. As mentioned, the slope correlation function can be prepared by placing a test source at various angles relative to a detector array and measuring the resulting slope of the detection distribution. Then 1711, the detector array can report the source location parameters so determined.

Optionally, the detection data can be used to provide a highly sensitive determination of the presence or absence of a source regardless of the source angle. To do so, all of the detection data in the short and long detectors may be added together 1712, thereby effectively treating the entire array as a single huge detector. Then 1713 the total detection rate may be compared to a normal or expected background value, thereby determining that a source is present if the total detection rate exceeds the expected rate substantially, such as exceeding by 1 or 2 or 3 times the statistical variation in the number of detections observed. If multiple detector arrays are present, such as a vehicle inspection station featuring detector arrays above, below, and on both sides of the inspection zone, then all of the detectors in all of the detector arrays may be added together to provide an even more sensitive detection of weak or shielded sources.

Embodiments of the detector array described herein can provide many advantages over conventional detectors and can economically solve important security inspection problems. (a) The detector array can detect a source with high sensitivity, due to its large area and high intrinsic efficiency and absence of shields or passive collimators, according to some embodiments. (b) The detector array can determine the front-versus-back position of the source and/or the lateral position of the source and/or distance of the source and/or angle of the source, according to some embodiments. (c) The detector array can scan trucks, cargo containers, railcars, airplanes, vans, cars, boats, and many other vehicles, and can localize any nuclear materials and/or radiological weapons found, according to some embodiments. (d) The detector array can detect and localize sources both in front and behind the detector array, according to some embodiments. (e) The detector array can scan two vehicles or other inspection items simultaneously, while identifying which vehicle has a radioactive source, according to some embodiments. (d) The detector array can detect and localize a plurality of radioactive sources simultaneously, according to some embodiments. (e) The detector array can be combined with a cosmic ray scattering inspection system, thereby providing two contrasting detection modes for revealing nuclear materials, according to some embodiments. (f) The detector array can scan across a wide area of the environment, and can thereby detect nuclear weapons concealed in buildings for example, according to some embodiments. (g) The detector array can perform an extremely sensitive scan of shipping containers in longer, high-statistics scan periods, thereby detecting even a well-shielded weapon or portions thereof, according to some embodiments. (h) The detector array can be assembled from available detector types including gamma-blind neutron scintillators, neutron-blind gamma scintillators, ionization-dependent scintillators that separately detect both gammas and neutrons, low-cost liquid scintillators, and light-weight gaseous ionization detectors, according to some embodiments.

The ability to localize a clandestine radioactive source rapidly is a key enabling factor in nuclear threat detection. Advanced radiation detection systems like those disclosed herein will be needed in the coming decades to protect innocent people from the threat of nuclear and radiological terrorism.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is defined by the appended claims.

What is claimed is:

1. A detector array for locating a radioactive source, comprising:
    at least 10 long detectors interleaved with at least 10 short detectors, each long detector and short detector being configured to detect particles from the radioactive source, each long detector being positioned parallel to an aiming plane that runs centrally from the back to the front of the detector array, wherein the long detectors and the short detectors are arranged in an alternating sequence, wherein each short detector is shorter than the long detectors by a distance of 1 to 3 times the thickness of the short detectors, wherein the back surface of each short detector is substantially coplanar with the back surface of one or more adjacent long detectors, and wherein the thickness of each long detector is 1 to 3 times the average interaction distance of the particles therein; and
    a processor configured to be communicatively coupled to each long detector and to each short detector respectively, and further configured to determine a position of the radioactive source by comparing detection data associated with the long detectors to detection data associated with the short detectors.

2. The detector array of claim 1, wherein the processor is further configured to determine a detection peak that encompasses one or more short detectors that have enhanced detection rates.

3. The detector array of claim 2, wherein the processor is further configured to determine that the radioactive source is in front of the detector array if the detection peak is narrower than the distribution of detections in the long detectors, and to determine that the radioactive source is behind the detector array if the long detectors and short detectors have similar distributions of detection data, respectively.

4. The detector array of claim 3, wherein the processor is further configured to determine:
    a lateral position of the radioactive source relative to the detector array;
    an angle of the radioactive source relative to the detector array; and
    a distance of the radioactive source from the detector array.

5. The detector array of claim 4, wherein the processor is further configured to determine the lateral position of the radioactive source relative to the detector array according to the lateral position of the detection peak.

6. The detector array of claim 5, further including non-transient computer-readable media containing a predetermined lateral-position correlation function that relates the lateral position of the radioactive source to the lateral position of the detection peak.

7. The detector array of claim 6, wherein the processor is further configured to determine the distance of the radioactive source from the detector array by calculating the width of the detection peak and applying a predetermined peak-width correlation function.

8. The detector array of claim 3, wherein the processor is further configured to determine that the radioactive source is outside the direct field of view of the detector array when the detection peak is in an endmost detector.

9. The detector array of claim 8, wherein the processor is further configured to determine a direction toward the source when the detection peak is in an endmost detector.

10. The detector array of claim 3, further comprising a first scintillator and a second scintillator, wherein:
    the first scintillator is configured to emit a first signal upon detecting a recoil proton; and
    the second scintillator is configured to emit a second signal, different from the first signal, upon detecting an energetic ion from a neutron-capture reaction.

11. The detector array of claim 10, wherein the processor is further configured to determine, responsive to an event comprising the first signal followed by the second signal within 50 microseconds of the first signal, that a fast neutron has been detected.

12. The detector array of claim 3, further comprising a vehicle configured to enclose the detector array and to block less than 10% of the particles incident orthogonally thereon.

13. The detector array of claim 3, wherein the shape of the detector array is an arc.

14. The detector array of claim 3, wherein the shape of the detector array is a pair of arcs spaced apart laterally.

15. The detector array of claim 3, wherein the shape of the detector array is an S-shape.

16. The detector array of claim 3, further comprising a plurality of slab-shaped counters wherein:
   a first set of the counters is mounted proximate to the short detectors respectively and a second set of the counters is mounted proximate to the long detectors respectively; and
   the thickness of each counter is less than 10% of the thickness of the short detectors.

17. The detector array of claim 16, wherein each short detector and each long detector are configured to detect a first particle type, and the counters are configured to detect a second particle type different from the first particle type.

18. The detector array of claim 16, wherein the short detectors and the long detectors are configured to detect particles in a first energy range, and the counters are configured to detect particles in a second energy range different from the first energy range.

19. The detector array of claim 3, further comprising an upper tracking chamber and a lower tracking chamber, each tracking chamber being configured to measure a track of a cosmic ray particle.

20. The detector array of claim 3, wherein the processor is further configured to perform a method comprising:
   calculating a total detection rate by adding the detection rates of all of the short detectors and long detectors;
   determining whether the radioactive source is present by comparing the total detection rate to a predetermined background rate;
   determining whether the radioactive source is in front or behind the detector array by comparing detection data in the long detectors to detection data in the short detectors;
   determining the lateral position of the radioactive source by calculating the lateral position of a detection peak;
   determining the distance of the radioactive source from the detector array by calculating the width of a detection peak and applying a predetermined peak-width correlation function; and
   determining the angle of the radioactive source relative to the detector array by calculating a slope associated with detection rates in the long detectors and applying a predetermined slope correlation function.

* * * * *